Figure 1:
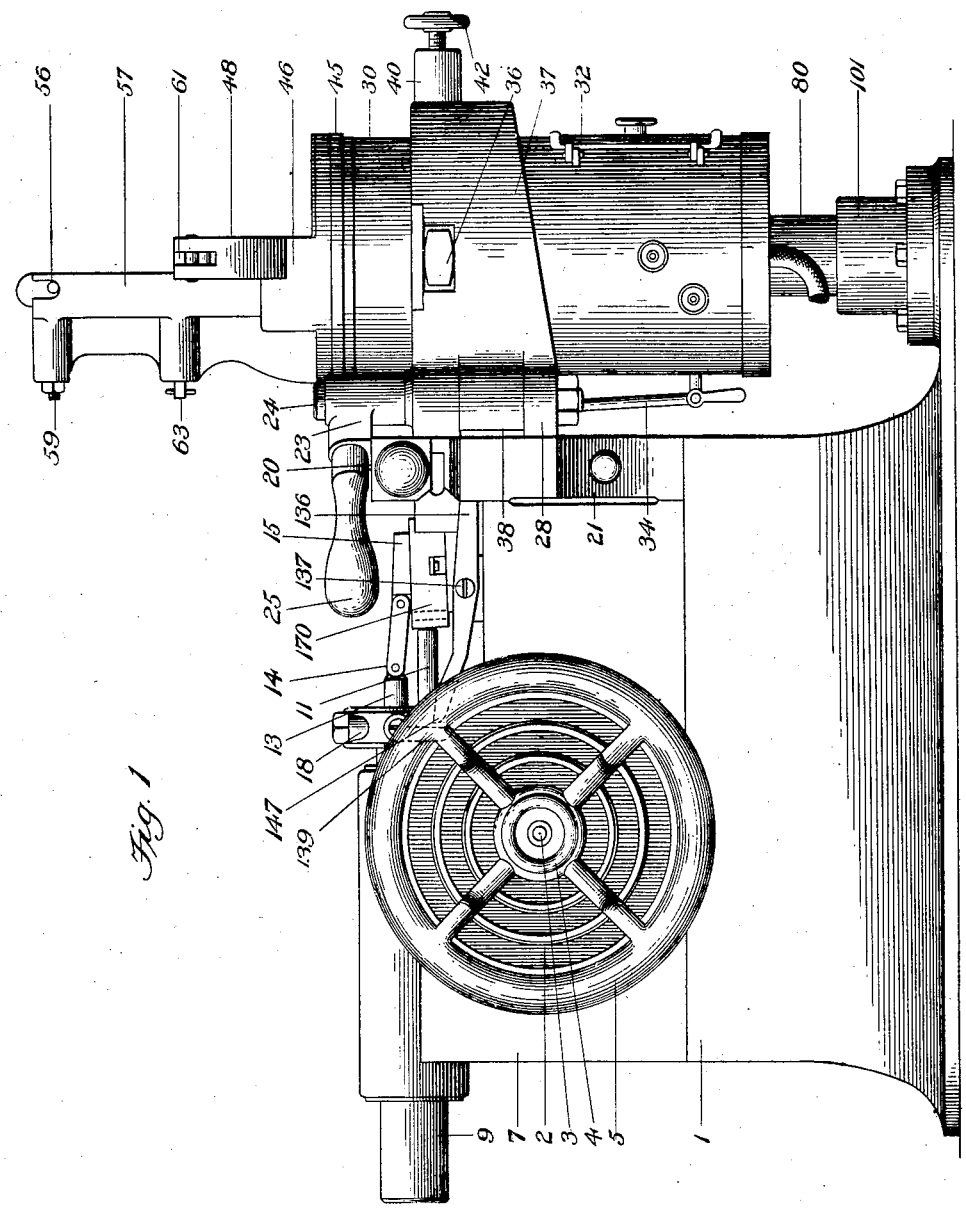

No. 861,430. PATENTED JULY 30, 1907.
F. H. BROWN, J. E. HANRAHAN & G. A. BOYDEN.
SORTS MACHINE FOR MAKING TYPE.
APPLICATION FILED JAN. 22, 1903.

11 SHEETS—SHEET 4.

Witnesses

Inventors
Frank H. Brown
John E. Hanrahan
George A. Boyden
By Mann & Co.
Attorneys

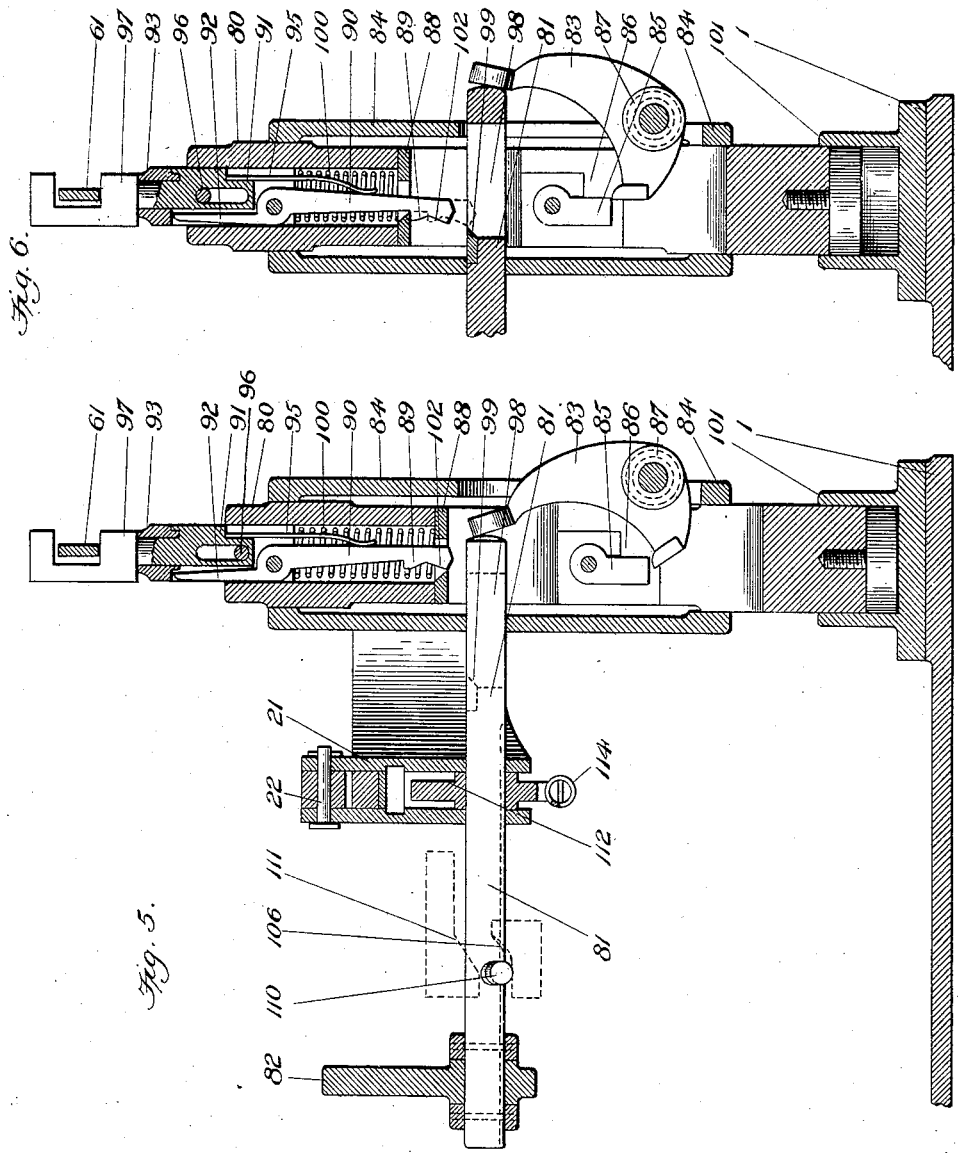

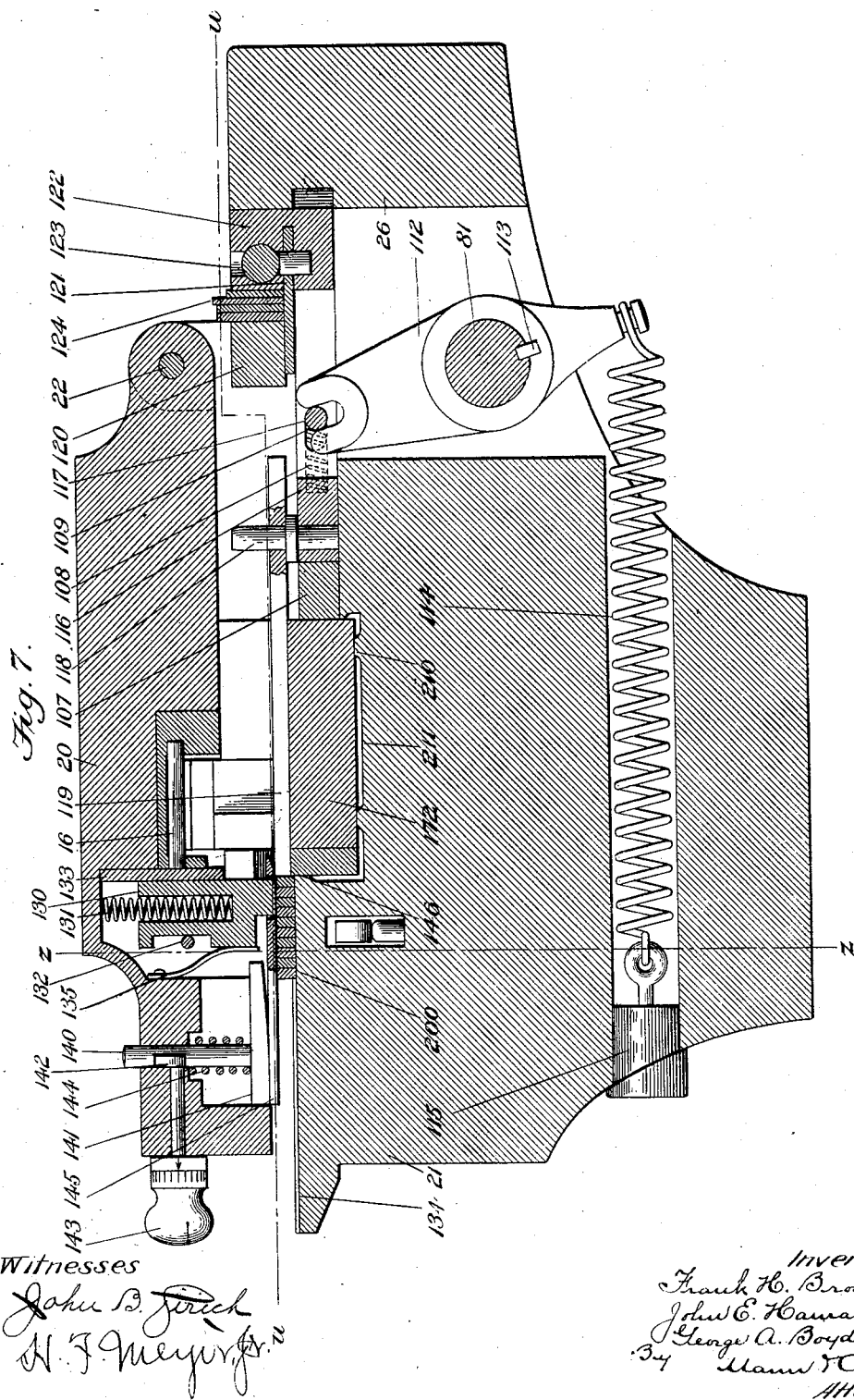

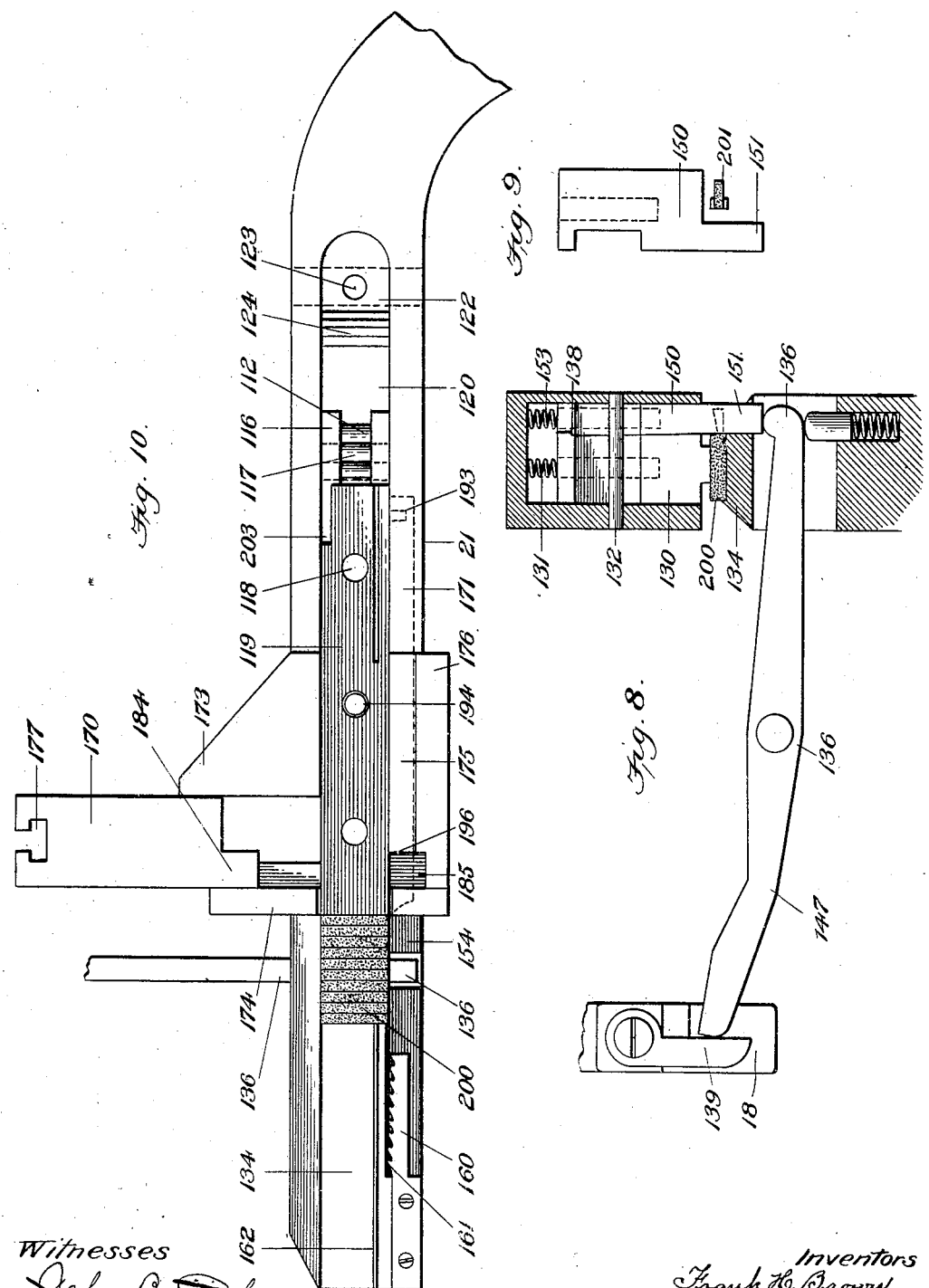

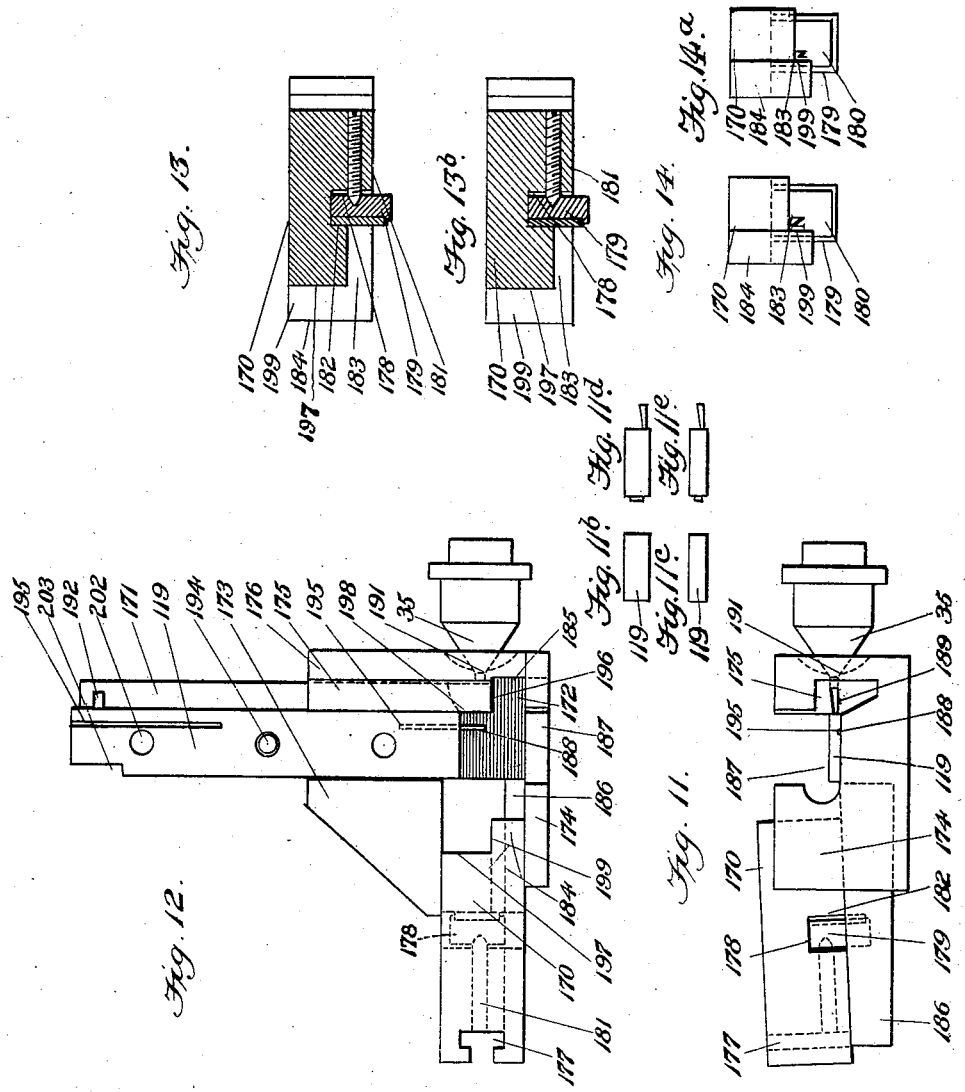

No. 861,430. PATENTED JULY 30, 1907.
F. H. BROWN, J. E. HANRAHAN & G. A. BOYDEN.
SORTS MACHINE FOR MAKING TYPE.
APPLICATION FILED JAN. 22, 1903.
11 SHEETS—SHEET 9.
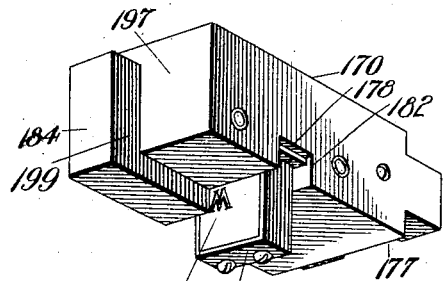
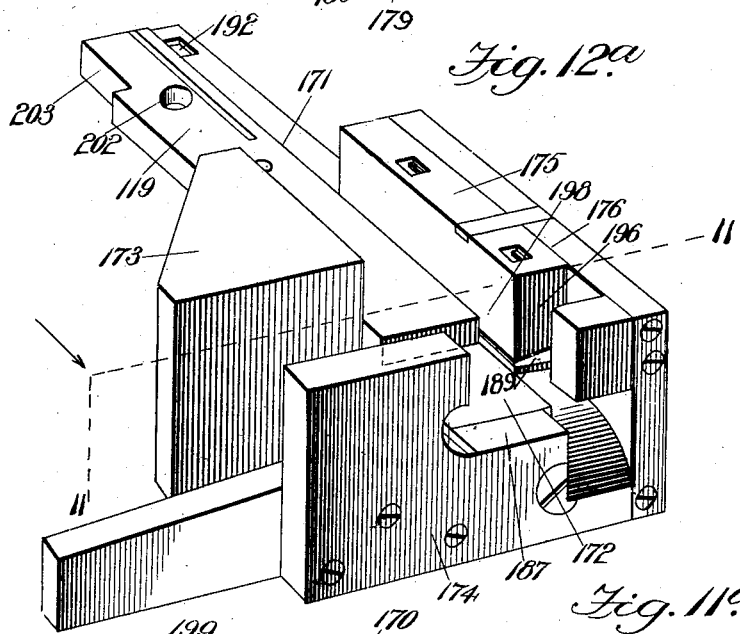
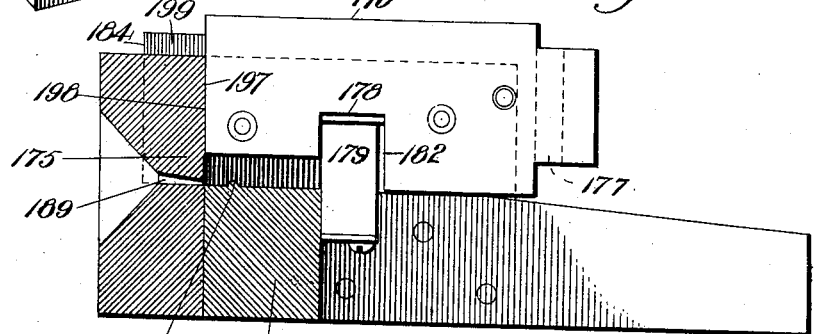
Witnesses
Wm. S. Hodges
Lewis Hodges
Inventors
Frank H. Brown
John E. Hanrahan
George A. Boyden
By George A. Boyden
Attorney
THE NORRIS PETERS CO., WASHINGTON, D. C.

No. 861,430. PATENTED JULY 30, 1907.
F. H. BROWN, J. E. HANRAHAN & G. A. BOYDEN.
SORTS MACHINE FOR MAKING TYPE.
APPLICATION FILED JAN. 22, 1903.
11 SHEETS—SHEET 10.
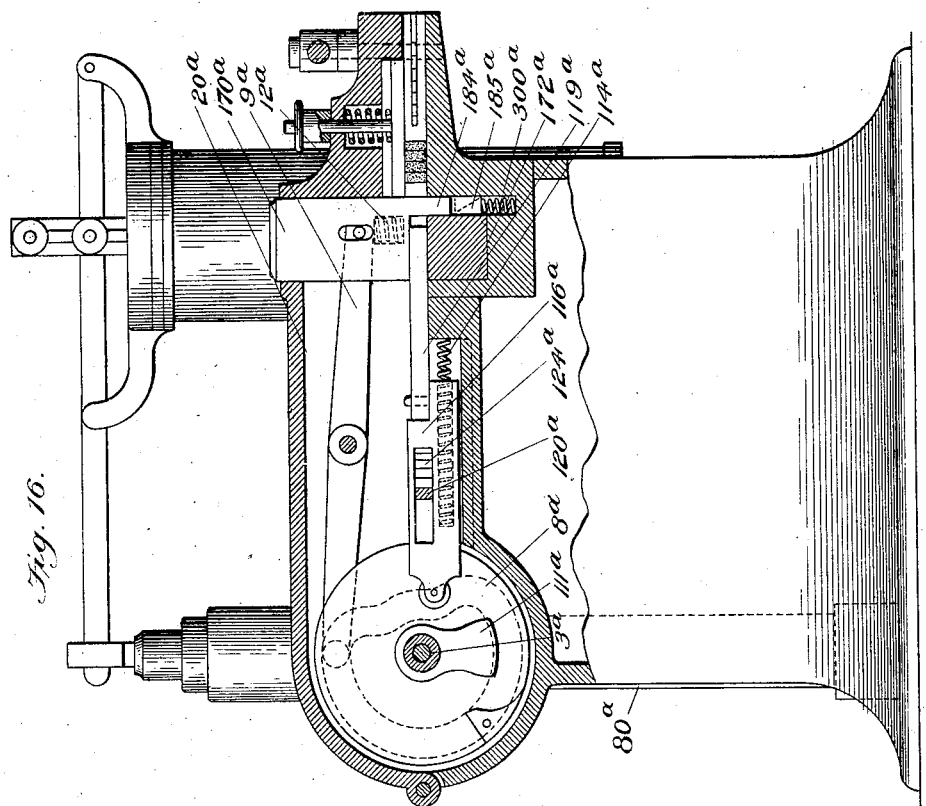
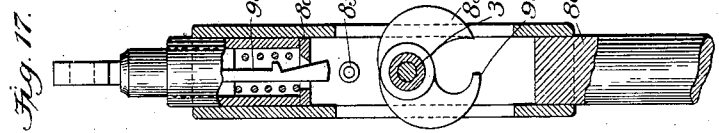
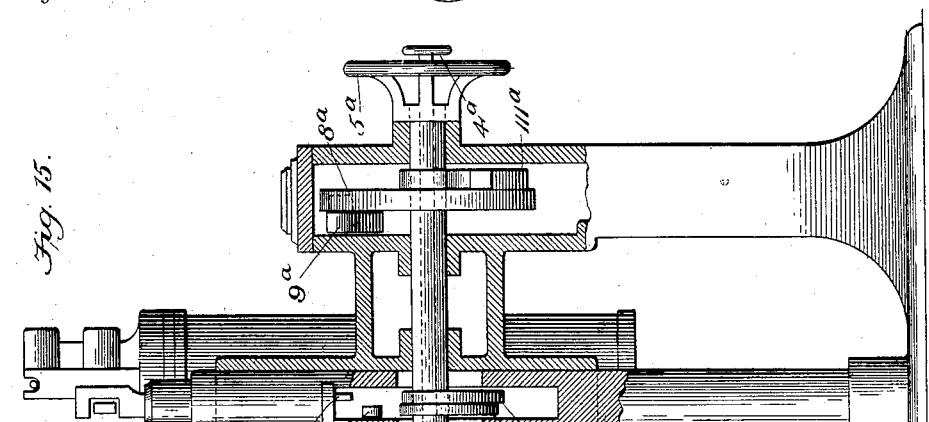

No. 861,430. PATENTED JULY 30, 1907.
F. H. BROWN, J. E. HANRAHAN & G. A. BOYDEN.
SORTS MACHINE FOR MAKING TYPE.
APPLICATION FILED JAN. 22, 1903.
11 SHEETS—SHEET 11.
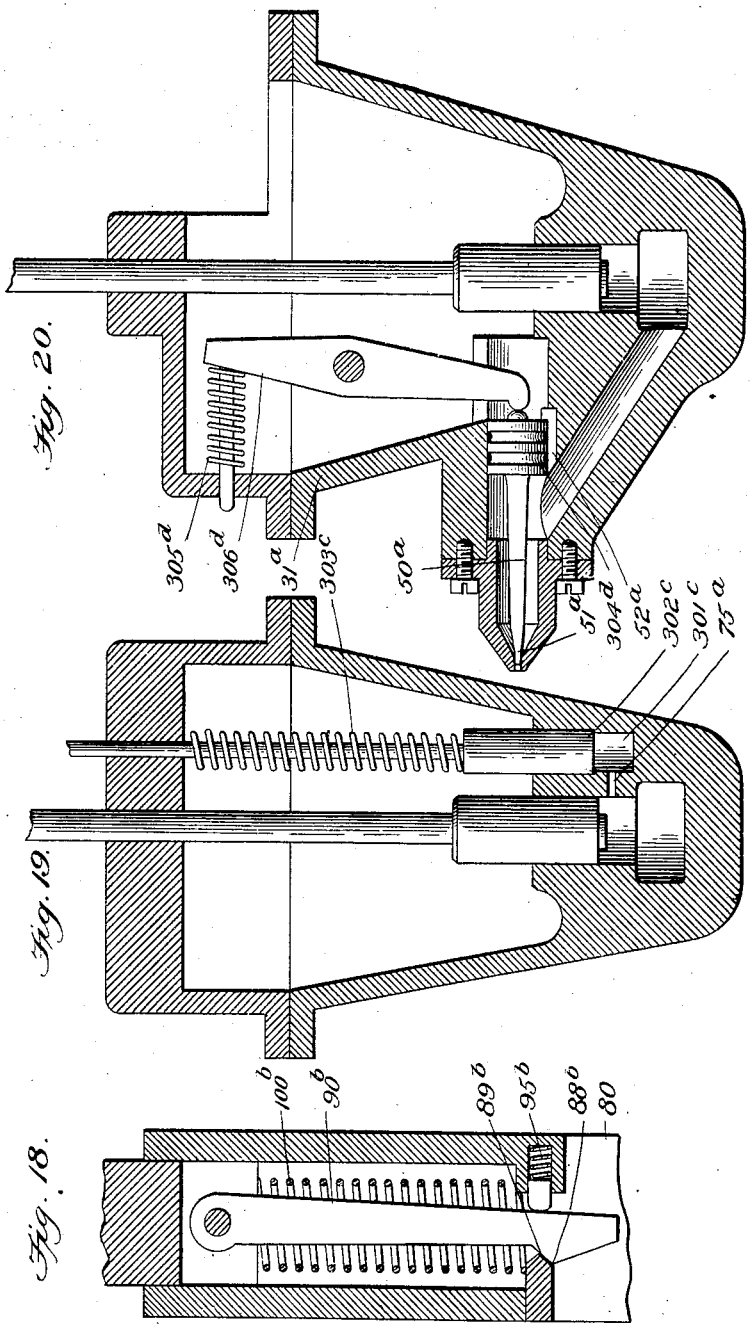

UNITED STATES PATENT OFFICE.

FRANK H. BROWN AND JOHN E. HANRAHAN, OF BALTIMORE, AND GEORGE A. BOYDEN, OF MOUNT WASHINGTON, MARYLAND, ASSIGNORS TO NATIONAL COMPOSITYPE COMPANY, OF BALTIMORE, MARYLAND, A CORPORATION OF DELAWARE.

SORTS-MACHINE FOR MAKING TYPE.

No. 861,430.  Specification of Letters Patent.  Patented July 30, 1907.

Application filed January 22, 1903. Serial No. 140,152.

*To all whom it may concern:*

Be it known that we, FRANK H. BROWN and JOHN E. HANRAHAN, citizens of the United States, residing at Baltimore city, in the State of Maryland, and GEORGE A. BOYDEN, a citizen of the United States, residing at Mount Washington, in the county of Baltimore and State of Maryland, have invented certain new and useful Improvements in Sorts-Machines for Making Type, of which the following is a specification.
This invention relates to the art of type-making in which are produced individual type characters, such as body and display letters, borders, ornaments, spaces and quads, that are used in ordinary type composition.

Heretofore the business of the type founder and printer have been conducted separately and wholly distinct. The printer has been dependent on the type founder for supplies of movable type, consequently the procuring of "sorts" or the addition to fonts of only a portion of its type characters has been attended with inconvenience, delay and expense. The desideratum, therefore, which this invention supplies, is a "sorts" machine adapted and constructed for use in printing offices, that will enable the printer to produce without delay as large or as small a quantity of any style of completed type as his business may demand, and to replenish "sorts" at will, without the employment of skilled labor or a knowledge of the practice of type founding.

A machine that will accomplish the above purposes should possess the following characteristics:—First, it should have its different combinations arranged to act independently to perform a unitary function and co-act to produce a plurality of functions. Second, it should have the various elements arranged and combined to be self-adjusting to compensate for expansion, contraction and wear. Third, it should automatically modify the functions involved to conform to the changed conditions established in casting various sizes and kinds of type. Fourth, it should be capable of making finished type of a desired size, and changed to make any other size, in a wide range of different sizes, at a minimum cost. Fifth, it should be organized so that the change necessary to produce different sizes of type can be made very speedily, because, while the machine is making a given size type it may become necessary, at a moment's notice, to make "sorts" of a larger or smaller size. Sixth, it should not require skilled attention to look after the details which, in type founding, require such exacting care and high degree of accuracy, in order that one unacquainted with the regular practice can operate the machine and secure the standard product.

Individual-type casting-machines recognized as practical at the present time comprises two classes, viz:— those known as the "automatic" and the "ordinary".
The automatic machine produces finished type, but besides being an expensive and complicated structure it requires a skilled mechanician for its operation and to make the adjustments necessary when changing to produce different sizes of type. These changes involve numerous adjustments that are difficult to make and require time, consequently the "automatic" machine is not suitable for casting "sorts" which require frequent and rapid changes. The ordinary machine may be operated either by hand or power. When operated by a skilled hand a wide range of sizes of type may be cast by this machine,—a continuous uniform rotary motion being imparted to make small type, and a quick rotary motion with a pause, to cast large type. The quick motion serves to preliminarily inject the molten metal into the mold, and the pause to allow the metal to entirely fill the mold and set therein. When this machine is operated by power with a continuous uniform speed, only small type can be cast. Machines of this class require the constant attention of an experienced operator to do the casting, and a skilled typemaker to set the different molds and matrices and make the numerous adjustments that are necessary in order to maintain the high standard of faces and sizes required by users of modern type. In making ready the "ordinary" machines, the mold previously used has to be moved from the block which takes from five to ten minutes' time. The required mold is then placed in position on the block and four screws set—two in each mold part. The two parts of the mold are then carefully brought together to ascertain how near they are to the proper position relative to each other. Adjusting screws, attached to the mold block, are then manipulated to bring the two mold parts near enough to the proper position to permit making a trial cast and the remaining screws tightened to hold the mold parts in their respective position. The jet end of the mold is then set in line with the nipple plate, care being necessary to locate it properly and adjust the tension between the two. Attention must then be devoted to the clamping mechanism, which firmly holds together the two parts of the mold while the molten metal is ejected thereinto cast the type. The trial matrix is next placed in position relative to the mold, and levers are adjusted in relation to the trial matrix to permit the matrix to open at the proper angle and time in order to discharge the type from the mold. Several casts are then usually taken for the purpose of heating the mold, and other casts are made from which to begin sizing the type bodies by measurement, first, to ascertain if the sides of the type body are parallel bodywise, and of the proper body measurement, and then to ascertain if they are parallel setwise, and of the proper setwise measurement. The setting of the mold parts so as to produce the proper size type is accomplished by adjusting set-screws, and by tapping the respective mold parts to bring them in position to secure type of standard measurement. Next the trial matrix has to be adjusted to bring the type-character in the center of the body "setwise", and in the proper position "bodywise." These several adjustments require great care and skill owing to the accuracy necessary for standard type, and consume from twenty minutes to two hours time for each change of the machine to make a different "bodywise" size. In addition to the adjustments already named, the pump mechanism, the type-ejecting mechanism and the maintenance of a coaction between all the parts requires constant supervision and skilled attention. Furthermore, the type product of the "ordinary" machine is not finished when it comes from the machine, as the jets have to be removed from the end of the type, the surfaces of the type-body rubbed down on four sides, and the feet tooled to finish that end of the type. From this statement, it will be seen that the "ordinary" type-casting machine, as well as the "automatic", is wholly unsuited for casting "sorts" or for use in printing establishments, for which the machine of this invention is intended.

Among the objects of this invention are:

First, to extend the domain of the printer by enabling him, in addition to producing the printed matter, to produce the type instrumentalities by which that matter may be obtained.

Second, to advance the art by enabling the printer to maintain perfect-faced type, by which the printed product is always of the highest standard.

Third, to provide a machine to produce various sizes and styles of type of the highest standard quality; to replenish "sorts" at will; and to permit the recasting of old and worn out type into new and more desirable faces.

Fourth, to provide such an organization or combination of the principal elements involved as will enable the desired type to be produced without skilled labor.

Fifth, to provide head mechanism arranged to cover the mold mechanism to protect the operator in case of a "spurt" of molten metal, and also to afford access to the mold mechanism for inspection and cleaning; to yieldingly support the metal receptacle so as to compensate for expansion, contraction and wear of the parts; to allow the metal receptacle to be swung around for inspection and cleaning; and to insulate the mold parts from the other parts of the machine, whereby the heat will be retained in the mold parts and not injuriously affect the adjacent parts of the machine.

Sixth, to provide mold mechanism susceptible of casting various size type, said mold mechanism comprising any form of structure or consisting of the following members: Interchangeable or adjustable parts that will self-set themselves ready for accurate adjustment without manual manipulation when changing from one size type to another; that will accurately adjust themselves when assembling to properly cast standard size type without measurement on the part of the operator; and that will cast type properly squared. A jet orifice permanently located for casting various "body-wise" size type, in order that the serrated surface left on the type-foot of all size type, after the jet has been broken off, will always be in the same plane so as thereby to encounter a tooling-off knife without any adjustment of the latter. A single type-ejector, to be used when casting spaces and quads, of the same "body-wise" size as the type. Interchangeable ejectors with one part of the mold, to cast type of different size "body-wise". Improved and simple means for adjusting ejectors "set-wise", whereby discretion on the part of the operator is unnecessary. A single jet-ejector that may be used in connection with any or all of the interchangeable type ejectors and which is adjustable "set-wise" by the means that adjusts the type ejectors "set-wise". And improved means for correctly and rigidly holding the matrix to the movable part of the mold so that the type-face will always be properly located on the body.

Seventh, to provide actuating mechanism that adjusts or regulates itself to conditions established by mold mechanism, susceptible of casting various sizes of type, said actuating mechanism consisting of any or more than one of the following combinations. Mold-placing mechanism that is positive, yielding and compensating, by which the movable part is approximately set in position, then permitted to accurately adjust itself, and any variations in the sizes, produced by wear or expansion, automatically compensated for. Mold-clamping mechanism adapted to firmly hold the mold parts together at any position to which they may be self-adjusted, and which will automatically compensate for any change in size of the parts produced by wear or expansion. Metal-receptacle mechanism supported in relation to the machine and mold parts in a sufficiently positive position for operating purposes, yet yielding to allow for expansion and contraction. Molten metal valve-mechanism arranged to completely and rapidly refill the well after each cast, to quickly and positively open and close the valves, whereby the molten metal is promptly discharged and cut-off, and provided with compensating connections, whereby the expansion and wear of the parts are compensated for. Pump mechanism provided with means to prevent the sudden stopping of the flow of molten metal when casting small type, whereby the pump mechanisms are relieved from the severe strain they would otherwise be subjected to. Pump and molten-metal valve-operating mechanism having a quick release by which the valves are instantaneously released to promptly cut-off the molten metal at the proper temperature, a variable release trip by which the valve and pump parts are automatically tripped, sooner or later, to accommodate different sizes of type cast, and a positive and uniform pressure force at all times by which all sizes of type are cast with a uniform density. Type-ejecting mechanism that will always move different sized type so that one side of the moved type will be in the proper position for the type to be discharged in reference to the typeway. Type "set" mechanism self-acting to conform with various insert "liners", by which the proper "set-wise" size of the type is secured without skilled manual adjustment. Type-delivery mechanism that will remove the type from the ejector, and also clamp and hold it while the jet is being removed and the foot of the type tooled. Jet removing mechanism that automatically accommodates the various sizes of type and remove the jets therefrom.

Improved foot-finishing mechanism arranged to tool or groove the serrated surface of the type-foot left rough by the removal of the jets; to permanently secure the tooling off knife in relation to the fixed jet orifice of the mold; to dispose of the removed particles of metal so that they will not interfere with the type on the type-way; and means to hold the type in proper relation to the said knife.

All of the above mechanisms are set forth in the following specification, and the inventive ideas involved are illustrated in the accompanying drawings, which include modifications of the machine and also of certain parts, but it is to be distinctly understood that the said drawings are intended for illustration only and not as defining the limits or scope of the invention.

Figure 2:
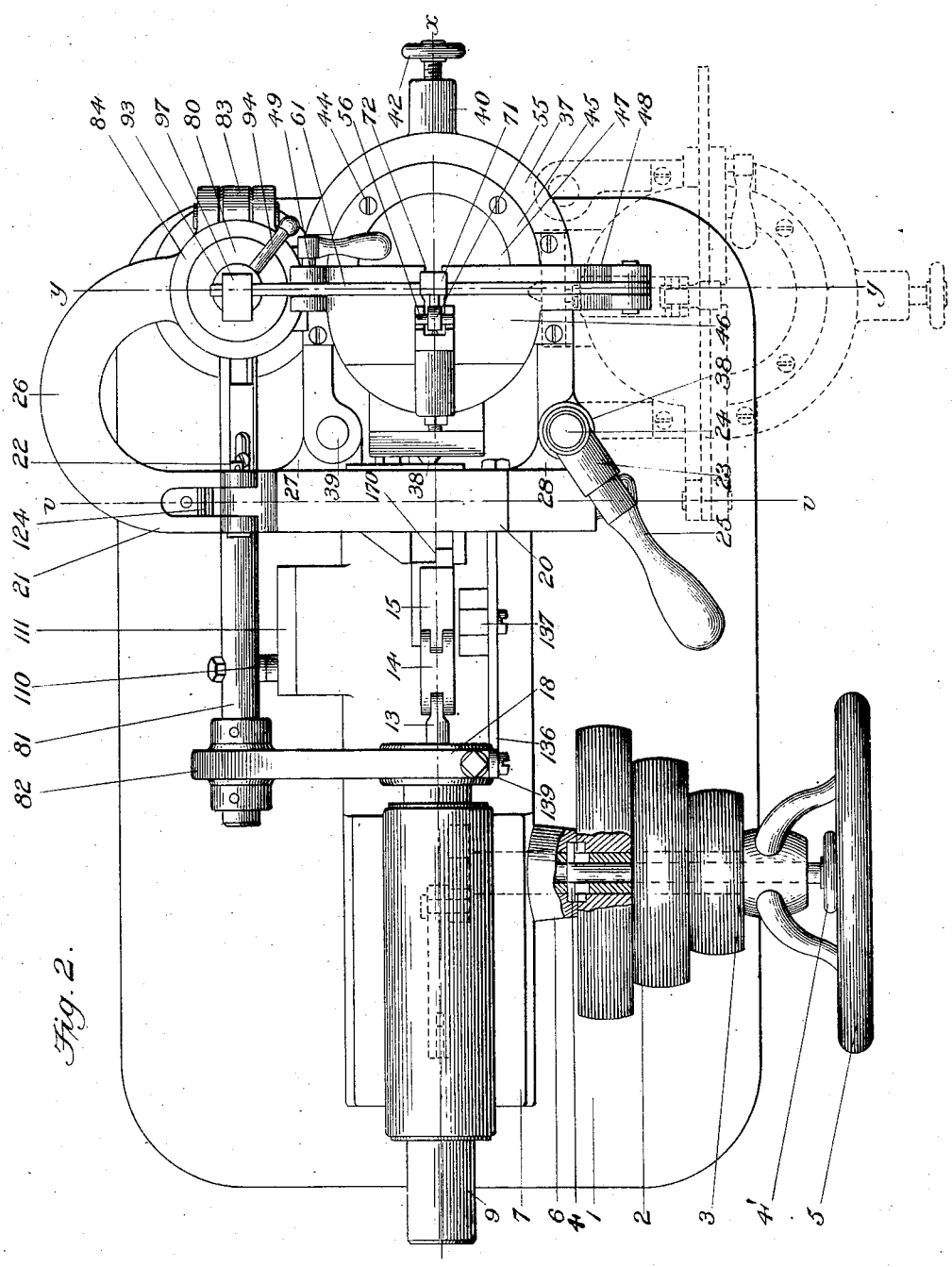
Figure 3:
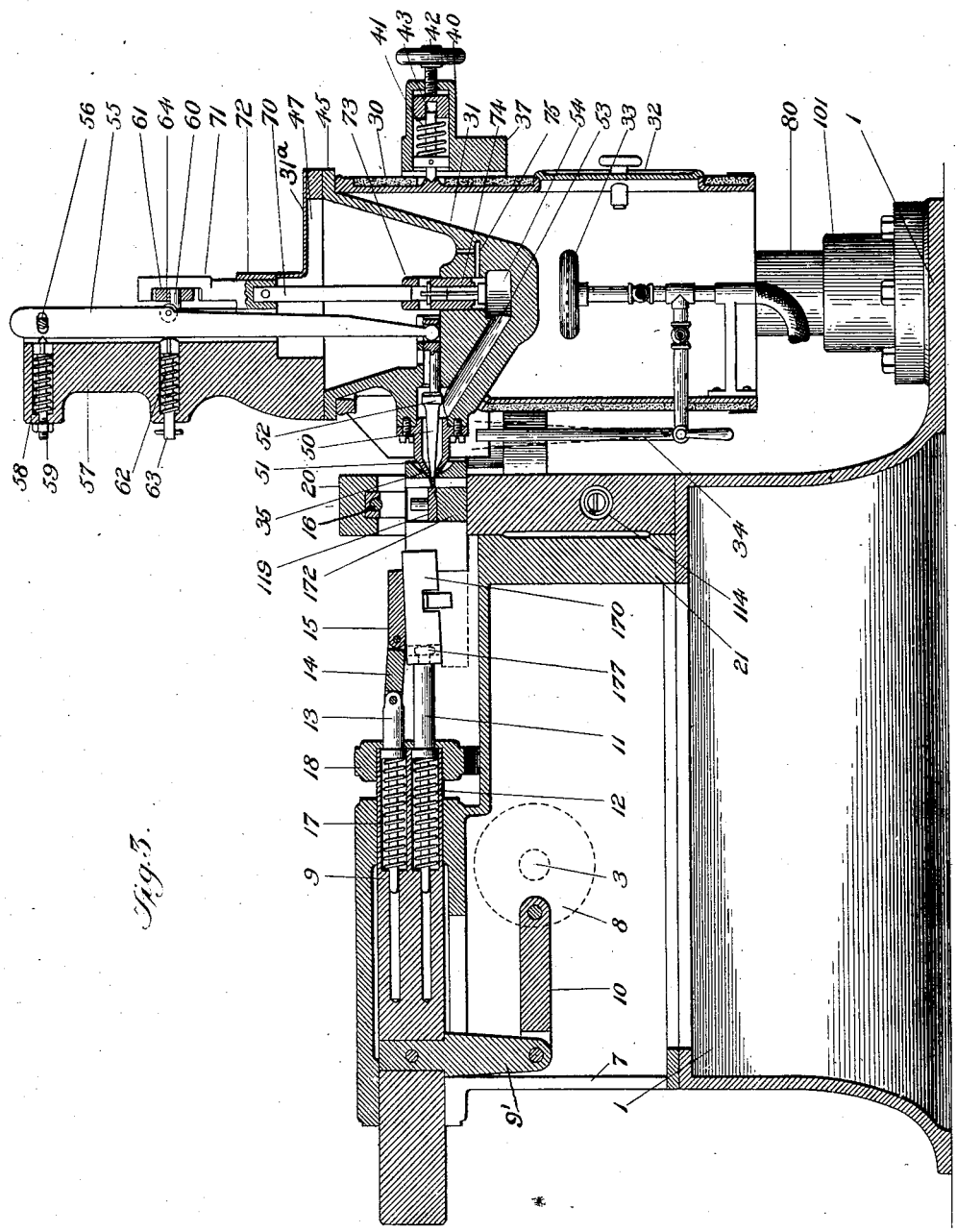
Figure 4:
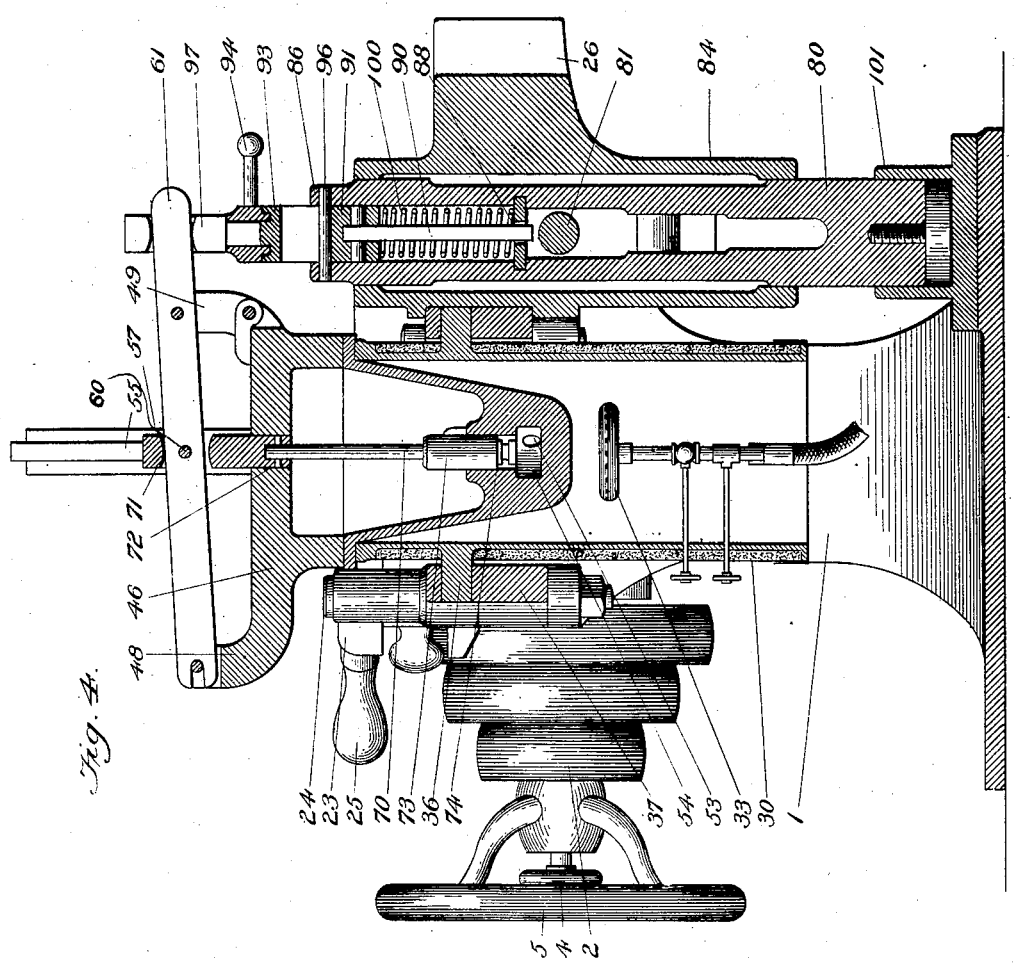

In said drawings: Figure 1 is a side elevation of the machine. Fig. 2 is a top view. Fig. $2^a$ is a detail. Fig. 3 is a longitudinal sectional view on line $x$—$x$ of Fig. 2. Fig. 4 is a cross sectional view on line $y$—$y$ of Fig. 2. Fig. 5 is a vertical section through the weight mechanism, and shows the reciprocating shaft. Fig. 6 is substantially the same as Fig. 5, but shows the weight raised. Fig. 7 is an enlarged vertical cross-sectional view of the head and yoke on the line $v$—$v$ of Fig. 2. Fig. 8 is a cross-sectional view of yoke head, on the line $z$—$z$ of Fig. 7. Fig. 9 is a detail side view of the jet dog. Fig. 10 is a top view of the type-way, mold and ejector. Fig. 11 is a side view of the mold parts. Fig. $11^a$ is a sectional view showing the insert mold part in casting position. Figs. $11^b$ and $11^c$ are detail end views of ejectors having casting faces of different dimensions. Figs. $11^d$ and $11^e$ are edge views of type bodies of body size corresponding to said ejectors. Fig. 12 is a top view of the mold parts. Fig. $12^a$ is a perspective view illustrating the same parts. Fig. 13 is a longitudinal sectional view of an insert mold part. Fig. $13^a$ is a perspective view of the corresponding part. Fig. $13^b$ is a view similar to Fig. 13 but with casting faces of a different dimension. Figs. 14 and $14^a$ are end views of the structures illustrated in Figs. 13 and $13^b$. Fig. 15 is an end elevation, partly in section of a modified form of the machine. Fig. 16 is a side elevation, partly in section of said modified machine. Fig. 17 is a vertical sectional view of the weight parts, cams and trips taken at right angles to Fig. 15. Fig. 18 is a sectional view of a modified latch mechanism. Fig. 19 is a sectional view of a modified overflow, for pump mechanism. Fig. 20 is a sectional view of modified molten metal valve mechanism.

The first part of the description now to be given will have reference particularly to the mechanism shown in the drawings from Fig. 1 to Fig. 14 inclusive.

The power applying mechanism (Figs. 1, 2, 3 and 4) comprises a drive pulley 2 that revolves loosely on the main shaft 3 and is made fast thereto, when desired, by suitable clutch mechanism 4 that instantly disengages or engages the two, by moving the clutch wheel 4' in or out, thereby affording a quick and convenient arrangement for this purpose which is essential in order to start the machine at its maximum speed and instantly release the power in case of accident to the parts. The hand-wheel 5 is rigidly secured to the shaft 3 and is used to operate the machine by hand, to test the position of the parts, before the power is applied. The shaft 3 rotates in the bearing 6 and passes into the hollow body 7 of the machine, where it is provided with a crank wheel 8, from which reciprocating motion is transmitted to the ram 9 by the connecting rod 10 and suitable connections such as the crank-pin secured to the wheel 8 and the pin in the lug 9', which is secured to the ram 9. With this mechanism are combined the several sub-combinations which receive their respective movements therefrom.

The head mechanism (Figs. 1, 2, 3, 7 and 10) comprises a mold yoke 20, pivoted at one end to the head 21 by the pin 22, and the other end secured thereto by the clamp 23 pivoted to the head 21, by the pin 24, which firmly secures it to the head. When the yoke is in the operating position and clamped to the head by throwing the handle 25 partly around, all of the mold parts are covered, and thereby affords a shield to prevent the molten metal from being thrown over the operator, in case the mold parts are not entirely closed when the pump acts. When the yoke is opened or thrown back, the mold parts and all the mechanism covered thereby are accessible for cleaning and inspection. The head 21 is also provided with a yoke 37 to support the metal receptacle 31 and said yoke is pivoted at one end to the head by the pin 24 that also forms the pivot for the clamp 23. The free end of the yoke 37 is detachably secured to the head 21 by a tapered pin, 39, that passes through an aperture in the free end of the said yoke and into a hole formed in the lug, 28, integral with the head, thus affording an efficient device to accurately draw the yoke to its proper operating position and permit it to be conveniently freed when it is desired to swing the yoke and receptacle away from the mold for inspection or cleaning of the parts. The receptacle, 31, is suspended in the yoke, 37, by trunnions, 36, which rest in bearings of such formation to permit the receptacle to have a slight vertically rocking and horizontal movement in the yoke, so that said receptacle is free to expand and to be yieldingly held in contact with the stationary mold parts, as will be hereinafter described under the head of "Metal receptacle mechanism."

The head, 21, supports the mold mechanism and has the stationary part thereof rigidly attached to it in such manner that an air space, 211, see Fig. 7, is formed between the mold parts and the head, by means of ribs or lugs, 210, of sufficient bearing surface to firmly hold the mold in its proper position but of such contact, between the two, that the radiation therebetween is reduced to a minimum, thus retaining the heat in the mold, transmitted thereto from the nipple 35, and from the molten metal ejected into the mold, and preventing it from passing into the machine. This insulation of the mold is exceedingly important, in order to keep the mold at a uniform temperature; to prevent the metal from setting in the point of the nipple, 35, before the valve therein is fully closed; to maintain a uniform temperature of the ejector, 119, by which excessive contraction and expansion thereof is avoided, and the correct "set-wise" size of the type thus insured; to insure perfect facing of the type in retaining the proper temperature of the mold, by the confinement of the heat thereto; and to prevent the machine proper from getting overheated and thereby rendered inoperative. The said ribs or lugs can be modified and still perform the functions desired, and instead of the air space the same may be filled with suitable non-conducting material, such as magnesia, which would be an equivalent of the air space.

The mold mechanism comprises a stationary mold part; a number of interchangeable type ejectors; a single jet-ejector; and a movable mold part.

The stationary mold part has a base, 172, which forms one side of the type casting surface, or mold cavity, and also has a bead, 188, which forms the indicative nick in the type and assists in preventing the type from being withdrawn from the base when the movable mold part is withdrawn after the cast has been made. To the base, 172, is secured the jet plate, 175, which is provided with an abutting surface, 198, that is at right angles to the casting surface of the base, and against which a counter abutting surface, 197, on the movable mold part abuts when the parts are assembled; a gaging surface, 196, at right angles to the abutting surface, 198, against which the gaging surface, 197, on the movable mold part fits, and which forms the gaging point from which the "set-wise" measurements of the type are calculated; and a jet orifice, 189, about two "points" wide, that is permanently located two "points" above the casting surface of the base, 172, which position affords ample surface to form solid type feet, after the jet has been removed and the serrated surface tooled off. The jet orifice always remains in this position in casting all size type in order to keep the type jet in the same plane, relative to the other parts of the machine, to be removed and the serrated surface, left by the removal of the jet, tooled off without adjustment of the actuating mechanism that performs these functions. The jet orifice, 189, is variable in area, in order to supply metal in greater or less quantities in accordance with the size type cast, and this variation in area is accomplished by having the position of the casting end of the jet ejectors, 171, withdrawn more or less from the gaging surface, 196, at the same time, and by the same means that determine the "set-wise" size of the type as explained hereafter. To the jet plate, 175, is secured the nipple plate, 176, to insure a tight joint between it and the jet plate and to maintain the molten metal induction port, in the nipple plate, always in one position relative to the mold cavity, thereby having the connection between the mold parts and the metal receptacle nipple, 35, at one place, which obviates any adjustments between the two, when casting various size type. The guide pieces, 173, and 174, are attached to the base, 172, and preliminarily guide or set the movable mold part, 170, to its position in relation to the stationary mold part when setting the parts for casting, but allowing sufficient freedom to the movable part to permit it to accurately adjust itself in relation to the stationary mold part. The guide piece, 174, is cut away at 187 to allow the type to be ejected from the mold parts after being cast.

The ejecting devices comprise any desired number of interchangeable type ejectors, 119, and a single jet-ejector, 171. The type ejector, 119, rests on the base, 172, and is provided with a groove that fits the bead, 188. These ejectors are interchangeable with the stationary mold, and for each "body-wise" size of type there is a separate ejector, and in changing from one size "body-wise" ejector to another, the one previously used is removed by simply lifting it out and dropping into its place one of the desired size. Either end of the ejector is adapted to form one side of the casting surfaces of the mold, one end being used to cast the type, and the other end, cut away at 203, which cutaway end, with a properly constructed matrix, being used to cast the spaces and quads of a less height than the type, thereby permitting the use of one type-ejector to cast either type, or spaces and quads of the same "body-wise" size, by simply reversing the ends of the said ejector in relation to the mold. The interchangeable ejectors, 119, are all of the same length and are adjusted "set-wise" by insert "liners" of predetermined thickness to give the desired "set-wise" size to the type, said "liners" being hereinafter explained under the caption "Type-set mechanism." The type-ejector is operated by a reciprocating cross-head attached thereto at 202, which is fully explained under caption "Type ejector mechanism."

The jet-ejector, 171, reciprocates in a cavity in the jet plate, 175, in which it fits sufficiently tight to form a molten metal-proof joint, but sufficiently free not to bind when reciprocated. The same jet ejector, 171, is retained in casting all sizes of type, as the jet on all type cast by this machine remains the same size "body-wise", but the jet changes "set-wise" in accordance with the "set-wise" size of type cast by having the jet ejector connected, at 192, to the same cross-head that actuates the type ejector, 119, and thereby, when the position of the latter is changed, by inserting the "liners", the position of the jet ejector is likewise changed, thus varying the length of the jet orifice in accordance with the "set-wise" size of the type that are to be cast.

The movable mold part is provided with an abutting surface, 197, which is at right angles to the direction of its movement, and is also provided with an extension, 184, which is formed with a gaging surface, 199, at right angles to the said abutting surface, 197. In operation the movable part, which is capable of a slight yielding movement in a lateral direction, is pressed against the stationary mold part, and the abutting surfaces, 197 and 198, of the movable mold part and the stationary mold part then meet squarely together, and thereby the movable part is accurately adjusted against the stationary mold part in closed position to cast type-bodies with feet and faces squared with respect to the sides. The said gaging surface, 199, of the movable mold part, extends back to the matrix, 180, as indicated by dotted lines, Fig. 12, and forms that type casting surface or mold-cavity wall from which the "set-wise" size of the type is calculated or determined. The said extension, 184, in addition to forming part of the said gaging surface 199, also forms the closure of the jet cavity, 189, when the parts are assembled.

The movable mold part, 170, has a right angle formation, see Fig. 14, which forms two longitudinal casting surfaces of the mold cavity; the vertical surface of said formation is the gaging surface, 199, before referred to, and the depth of this surface governs the "body-wise" size of the type in connection with a type ejector, 119, of the same depth; the horizontal surface of said right-angle formation projects over the ejector, 119, when the parts are assembled for casting, sufficiently far to make a close joint there-between when casting any size type set-wise from the smallest up to thirty-six "points" "set-wise". Transverse to the said two casting surfaces is a slot, 178, that forms two shoulders, 182, at right-angles to the said vertical and horizontal casting surfaces, and against which shoulders the face of the matrix, 180, is rigidly held and accurately squared with respect to both of said casting surfaces, thus insuring that the face of the type will be square with respect to the sides of the type-body.

The matrix attaching device consists of a holder, 179, having a recess which forms a frame or flange which extends around three sides of the holder, and in which recess the matrix 180 accurately fits, and the edges of the matrix on three sides are in contact with said frame or flange. A binding screw, 181, threaded into the body of the movable mold part, 170, is provided with a conical end which engages with a counter conical depression in the back of the said matrix holder, 179. The face side of the matrix, 180, projects forward from the frame or flange of the holder; and the position of the conical depression in the holder is such that when the screw forces the matrix against the shoulders, 182, of the slot 178, the effect on the matrix and its holder is first to firmly press the matrix against the said shoulder, and, second, to force them upwardly and tightly press the edge of the matrix against the top of the transverse slot, 178, thereby always placing the type character that is on the matrix in the correct position relative to the aforesaid two casting surfaces or sides of the mold-cavity to insure the proper position of the said character and secure perfect alinement of all the type characters when they are composed into lines.

The means to connect the movable mold part, 170, to the actuating mechanism, comprises a T-slot, 177, arranged to loosely fit over a counter-formed head on the stem 11; by this means the movable mold part is actuated toward and from the stationary mold part, and at the same time, owing to the loose fit between the T-slot and said head sufficient lateral movement is allowed to the movable mold part, 170, for the parts to correctly adjust themselves in assembling.

The movable mold part and the ejector both move freely without friction, toward and from the stationary mold part, and are clamped tightly against the stationary part only when they have been assembled therewith, thereby preventing the parts from wearing, which is of great importance owing to the accuracy required to cast standard size type.

The actuating mechanism comprises one, or more than one, of the mechanisms that impart movement, or action, to the various elements that perform the required functions, and is characterized by having parts so constructed and combined that the sub-combinations act independently to perform a single function, or co-act to perform a plurality of functions; self-adjust themselves to compensate for the ever changing conditions due to contraction and expansion and wear; and also automatically vary or modify their functions to meet the requirements of the changed conditions established in the mold parts in casting various sizes of type.

For example, first, the mold placing combination or assembling mechanism places the movable mold part in position with the stationary mold part and thereby performs a single function, and the said combination then co-acts with the mold parts to hold them together in close contact, but sufficiently yielding to permit a special formation of the mold parts to effect a proper adjustment of themselves, to accurately size and cast standard type. The action of placing the mold is the single function referred to, and yieldingly holding the mold parts together while being accurately adjusted, comprises the plurality of functions referred to. This explanation illustrates what is meant by the terms single function and plurality of functions.

Second, the metal receptacle when heated more or less, expands and contracts in accordance with the difference in temperature, and it is essential that the connecting nipple between it and the molds parts be held in contact at a sufficient pressure to insure a tight molten metal joint there between, but not so great that the nipple and mold parts would be injured by excessive pressure. Therefore, the metal receptacle is loosely supported in a yoke and held in its position against the mold parts by a spring located diametrically opposite to the connecting nipple which is sufficiently strong to make the desired contact, but will yield and re-act in accordance to the changing size of the parts as they expand or contract, or if the parts in contact change in size from wear, the yielding connection will compensate for the same without manual adjustment. This explains what is meant by the expression "self-adjusts."

Third, the pump is required to eject under a high and always uniform pressure, more or less molten metal in accordance with the size of type cast, therefore, it must have a large capacity to cast large type, and said capacity should be modified in casting small type, otherwise the sudden stopping of the large flow of metal would create a destructive force on the parts involved. This discharging capacity of the pump in this machine is automatically modified according to the different amounts of molten metal required in casting different size type, by having the pump-well provided with a molten metal overflow passage which is fully active in discharging back from the pump-well to the metal receptacle the excess of metal when small type are cast, but which excess discharge is automatically modified by diminution as more and more molten metal is required for type of increased size, until said excess discharge wholly ceases when the larger sizes of type are cast. This explains what is meant by the expression "automatically modified."

These expressions "single function," "plurality of functions," "self-adjusts" and "automatically modified," illustrated by the foregoing examples, are more or less applicable to the other sub-combinations of the actuating mechanism, all of which are fully described under their respective captions in the specification, and which will now be described in proper order.

The mold placing mechanism (Figs. 1, 2 and 3) comprises the stem, 11, provided with a head that works in a vertical tee slot in the end of the movable mold part, 170, that transmits motion from the ram, 9, to the movable mold part and approximately places it in position relative to the stationary mold part. The stem, 11, is provided with a spiral spring, 12, to afford a yielding resistance between the movable mold part and the ram to permit the movable mold to adjust itself with the stationary mold part and the motion of the ram to be continued to actuate the mold clamping mechanism after the mold parts have been adjusted, and also to compensate for any change in the sizes of the parts due to expansion or wear.

The mold clamping mechanism (Figs. 1, 2 and 3) comprises the spring 17, the stem 13, the link 14, and the wedge 15. The ram 9 transmits motion to the wedge 15 to move it forward and tightly clamp the insert mold, 170, at any place it may be adjusted to in relation to the stationary mold part, by passing under the roller, 16, that forms the upper bearing for the wedge. The roller, 16, reduces the friction on the wedge in clamping the mold part and also forms a common locking center that permits the engaging surfaces of the mold parts to assume their proper position relative to each other and thereby insure tight joints between the same when casting. The link 14 connects the wedge and stem and affords, to the wedge, vertical movement to insure individual wedging effect in clamping the mold parts. The spring, 17, affords a yielding medium between the ram 9 and the wedge, by which the latter will always be driven home by a predetermined pressure and any expansion and contraction or wear of the parts compensated for.

The metal receptacle mechanism (Figs. 1, 2, 3 and 4) comprises a casing 30 to confine the heat around the metal receptacle 31, and it is supported on trunnions, 36, that rest in bearings on the yoke, 37, of such formation (see Fig. 1) that the position of the nipple, 35, can shift to properly make connection with the mold mechanism and at the same time retain the receptacle in its proper relation to the other parts of the machine, and also permit the parts to expand and contract. The metal receptacle is supported on the same horizontal plane as that of the contact point between the nipple, 35, of the receptacle, and the mold mechanism, to allow for vertical expansion of the parts up and down from that plane, and in doing so not to disturb or affect the connection between the receptacle and the mold mechanism. The casing, 30, supports the metal receptacle 31; the hood 31ª that forms a cover for the receptacle, to prevent splashing of the metal; the main burner, 33, that heats the receptacle 31; and the pilot burner 34, that heats the nipple 35. It also has a door, 32, to afford access to the main burner. The metal receptacle 31 and the hood 46 are rigidly fastened to the casing 30 by screws 44 that pass through the flanges 45 projecting from each. The hood 46 is provided with a lid, 47, that swings to open and close the receptacle 31; a vertical arm that supports the valve lever, 55; an arm, 48, to which the pump lever is pivoted (Fig. 4); and also a bearing 49 to support and guide the free end of the lever. The yoke 37 is pivoted to the head at 38, and extends around the casing 30, with the other end secured to the head by a tapered pin, 39, that extends through the boss, 27, on the yoke and into a lug cast on the head 21. By removing the pin the yoke and all the metal mechanism can be swung around to afford access to the different parts contiguous thereto, for cleaning and inspection. The yoke 37, is provided with a boss, 40, in which is arranged a pin, 41, and spring 43, that presses the pin against the casing, 30, and firmly holds the nipple, 35, in close contact with the nipple plate at a predetermined pressure, governed by the tension put on the spring, by adjusting the hand-wheel 42, irrespective of the continual variation in the size of the parts due to expansion and contraction, affording means to automatically compensate for expansion and contraction, and permitting the parts to be conveniently displaced and replaced, without requiring skilled labor to adjust the parts.

The metal valve mechanism (Figs. 1, 2, 3 and 4) comprises the stem 50, on which is formed the eduction valve 51, that controls the port through which the metal is ejected from the receptacle 31 to the mold cavity, and also the induction valve 52 that controls the port through which part of the molten metal passes, by way of the duct 53, from the metal receptacle to the pump-well, 54. Located in the pump plunger 73 is a second induction valve, 74, that permits the metal to also flow into the well 54, in addition to the valve 52, and thereby affords a second admission of the metal to insure the rapid and complete filling of the same, after every stroke of the pump. The valve 74 remains open until the pump plunger 73 drops when it is instantly closed, and any back flow there through to the metal receptacle 31 prevented. The vertical valve-lever 55 is supported at its upper end by a pin, 56, that rests in horizontal slots formed in each wing of the vertical arm, 57. The compression spring 58 through pin 59, forces the top end of the lever 55 outward toward the lug, 60, on the pump-lever 61. The lug 60 is secured to the pump lever 61, and moves the vertical valve lever 55 to close the eduction valve 51, and is located in relation to the vertical lever 55 so as to multiply the movement of the end of the lever connected to the valve stem 50, by which a greater movement is imparted to the lower end of the stem 50 from the lesser movement of the lug 60, thereby quickening the action of the valve stem 50, in order to close the valve 51, to cut off the metal at the jet, at the proper temperature. By the action of the spring 58 the valve stem 50 is forced toward the nipple 35 and the valve 51 held against its seat; at the same time the spring 58 maintains a yielding condition which automatically compensates for the variations in sizes of the parts they are continually undergoing due to expansion and contraction and wear. The compression spring 62 and pin 63 force the lower end of the lever 55 outward, when the lug 60 and lever 61 drops, and with it the valve stem 50, which opens the eduction valve 51 to permit the ejection of the metal from the receptacle 31 into the type mold cavity, and at the same time close the induction valve 52, to prevent the return of any metal, therethrough, from the well 54 to the receptacle 31. The valve lever 55 is provided with a roller, 64, to reduce the friction between the lever 55 and the lug 60 when the latter forces the former back, to seat the valve 51 by the upward motion of the pump lever 61.

The pump mechanism (Figs. 3 and 4) comprises the pump lever 61 pivoted to the arm 48 (Fig. 4) and attached, by the clevis 71, to the rod 70 that extends down, through the bearing 72, to the metal well 54, where it is secured to the pump plunger 73. The pump plunger 73 fits the bore of the well very accurately to insure a comparatively tight joint between the two, to prevent the metal in the well from escaping, through the joint, when the pump acts. Located a little below pump plunger 73, in the wall that forms the well 54, is a small passage 75 that leads from the well into the metal receptacle 31 and which forms an overflow from the well that prevents the sudden stopping of the flow of the molten metal and the movement of the pump plunger 73, to relieve the different parts of the metal mechanism from the severe strain they would be subject to, if there was no outlet for the metal, when casting small type with the high pressure required for large type. Without the overflow in casting small type the mold is filled by a slight movement of the pump plunger and the movement of the molten metal instantly stopped, causing a shock or jar to all the parts involved, similar in principle, to that of the hydraulic ram. When casting large type a comparatively larger amount of the metal is required and the mold more gradually filled than in casting small type, hence the need of such an overflow is not necessary, in fact, detrimental, and the passage 75 is then cut off by the pump plunger 73 passing over and closing the passage 75, in discharging the larger amount of metal, thereby preventing the overflow; consequently the conditions arising in the pump actions, varying from the minimum to the maximum, in casting large and small type, where a fixed pressure is used for both, are herein compensated for by automatically modifying the functions of the pump mechanism.

The pump and metal valve operating mechanism (Figs. 2, 4, 5 and 6) comprises a weight 80 sufficiently heavy to produce the required pressure on the molten type metal to perfectly cast the maximum size type. The weight, 80, is lifted by the movement of the shaft 81 attached to the ram, 9, by the arm 82, and reciprocates with the same. The forward motion of the shaft actuates the lever 83, pivoted to the weight-sleeve 84, and imparts an upward movement to the short end of the said lever, provided with a hardened steel tip, that engages with the dog 85, pivoted to the weight 80, in such manner that when the short end of the lever 83 travels through its arc, the weight 80 is lifted to the desired height, and, then, when the lever tip passes from under the dog 85 the weight 80 will be freed and instantly dropped, exerting its full force on the pump lever 61. The dog 85 rests against a projection, 86, on the weight that prevents it from swinging toward the lever 83, but free to swing in the opposite direction, in order that when the lever 83 makes its return movement, which is produced by the twisted spring 87, the dog is moved back thereby to permit the same, and then by gravity drops back into its place and assumes the position to re-engage the short end of the lever 83 to again lift and drop the weight 80. To the weight 80 is secured a keeper, 88, which engages with the lug 89, on the latch 90, when the weight 80 is raised. The latch 90 is pivoted to the shank 91 and forms the link that connects the shank and the weight 80 when the lug 89 engages the keeper, and it is provided with a finger, 92, that projects upward and is in contact with a horizontal eccentric on the revolving collar 93 in such manner that when the latter is turned, by the handle 94, the finger is forced outward by the eccentric and the lug 89, on the latch, 90, prevented from engaging the keeper 88, in order to permit the weight to drop without moving the shank or actuating the pump mechanism, when not desired, while the machine is in motion. The end of the latch below the lug 89 has an incline, 102, by which the time of disengagement between the keeper 88 and the latch 90 is varied in accordance to the distance the weight drops before released from the shank 91, and which is governed by the size of the type cast, as hereinafter explained. The flat spring 95 at its upper end is secured to the shank 91 and its free end bears against the latch 90 to cause the lug 89 thereon to engage with the keeper 88 when the weight 80 is raised to permit the same. The shank 91 has a vertical reciprocating movement in the weight 80, with the stroke limited by the slot therein and the pin 96 secured to the weight, and carries a clevis, 97, rigidly attached thereto. The clevis, 97, is cut away to receive the pump lever 61 when placed in the operating position and to release the pump lever when it and the metal receptacle mechanism is moved to one side. A spiral spring, 100, is located between the shank, 91, and the keeper, 88, and lifts the shank 91 and the adjuncts attached thereto, when the latch 90 is released from the keeper 88 as the weight drops. When the above described clevis parts are in the position shown in Figs. 4 and 5 they occupy their normal or "up" position, (which they maintain when and while the weight is being lifted) and the weight 80 occupies its "down" position. When the shaft 81 moves forward the lever 83 moves therewith and its short end moves upward, and having engaged with the under side of the dog 85 lifts the weight 80, and when the latter is lifted to its maximum height the lug 89, on the latch 90, engages with the keeper 88 by the action of the spring 95, which forces it into that position. In the meantime the short end of the lever, in lifting the weight 80, describes an arc and passes from under the dog 85 and thereby drops the weight 80, and the latch 90, shank 91, clevis 97 and pump lever 61, are pulled down with the weight and the full force thereof instantly exerted on the molten metal in the well 54, through the pump lever 61, the rod 70, and the plunger 73. When the weight parts are dropping the lower end of the latch 90 passes into a slot, 98, in the shaft 81, provided with a hardened steel dog, 99, which latter encounters the incline 102, on the lower end of the latch, as the shaft moves forward which releases the lug 89 from the keeper 88, allows the spring 100 to act and thereby lift the latch, shank, clevis, pump lever and pump parts and restore them to their normal or "up" position, also instantly actuating the metal valve 51 to cut off the metal at the proper temperature and places all the pump and valve parts in position ready for another cast, while the weight 80 is still moving downward at its full velocity, which is effectually cushioned, to relieve the eighty-pound blow of the falling weight, by suitable dash pot mechanism 101, arranged at the bottom of the weight 80. The time of the weight release is governed by the size of type cast, i. e., when small type are cast the pump plunger 73 and weight 80, with the intervening connecting parts, traverse but a small portion of their stroke as a comparatively small quantity of metal is ejected from the well 54. This partial traverse, however, is very rapid throughout its entire range, whatever that may be, as it varies in length according to the size of the type cast, and continues so until the mold is filled, then by means of the overflow through passage 75, from the well 54, still continues but very slowly, which practically keeps the incline 102, of the latch 90, comparatively elevated in reference to the contact point of the dog 99 (dotted lines Fig. 6), and in this position the greater width of the incline comes in contact with the dog 99, which is moving toward the latch, thereby releasing it from the keeper 88 sooner than would occur if the latch dropped a greater distance, as in casting large type. Consequently, in casting small type the latch 90 drops but a short distance and, thereby, exposes the wide part of the incline to the dog 99, thus quickening the release; and when casting large type the latch 90 drops its full distance and exposes the narrow part of the incline, to the movement of the dog 99, and thus delays the release. Therefore, the smaller the type cast the quicker the pump parts are released from the falling weight and the larger the type the slower these parts are released, and in all intermediate sizes the release is in accordance with the quantity of metal required by the size of the type cast. These changes in the pump actions and pump accessories are automatically modified by the conditions established by the different size casts, from the minimum to the maximum, and are of the greatest importance in a machine of this class. Furthermore, in these several movements there resides a unison of action which varies in point of time, with the size of type cast, i. e., to quickly refill the well 54 with the amount of metal displaced; actuate the several valves to shut and open the molten metal ports at the right instant to conform to the changed conditions of the different size type; and cut off the type jet from the metal supply at the proper heat unit to insure the clearance of the gate in ejecting it from the mold and the nipple port from being clogged with chilled metal. These several actions; the opening of the eduction valve, 51; the closing of the induction valves 52—74; the drop of the plunger 73; the passage, 75, remaining opened or closed the proper time to meet the changing requirements; the trip or release of the latch, 90, and the reverse actions of all these operations, are effected in the fraction of a second and all automatically varied or modified to fill the changed conditions required in casting various size type, without skilled attention or manipulation.

By the use of a weight to create the pressure, to force the metal into the mold parts a positive and uniform pressure is always retained on the metal, when casting, throughout the stroke of the pump plunger, thereby producing type of a standard density also obviating the necessity of skilled attention and manipulation in maintaining the proper pump pressure as the weight remains the same irrespective of the length of time it is used and the change of temperature of the parts.

The type ejecting mechanism (Figs. 2, 5, 7 and 10) comprises the shaft 81 which in addition to the reciprocating motion, to operate the pump mechanism, partially rotates or "rocks" to operate the ejecting mechanism. The latter motion is imparted to the shaft by means of a roller 110, secured to the shaft, which engages with an incline on the cam, 111, (see dotted lines, Fig. 5) secured to the body 7 in such relation to the parts that when the shaft moves the last third of its stroke the cam and roller partially rotate the shaft one way. The arm, 112, is attached to the shaft and oscillates in a slot in the head 21 and transmits motion to the cross head 116 from the shaft. It is provided with a feather, 113, that rests in a slot in the shaft which permits the shaft to reciprocate at the time it partially rotates. The upper end of the arm 112 is attached to the cross head 116 by means of a pin, 117, working in a slot therein. The cross head 116 reciprocates in guideways cut in the side of the head, 21, and is provided with a pin, 118, that passes through a hole in the ejector, 119, to secure the latter to the former. The ejector 119 when moved forward, by the action of the cam and intermediate parts, ejects the type from the mold parts after they are cast and always moves forward to a predetermined point, irrespective of any wear of the cam or play between the parts, as the cross head 116 contains two slots 109 provided with springs, 108, which furnish a yielding connection between the cross head and the pin, 117, thereby permitting the movement of the cross head to stop at a definite position by coming against an abutment, 107, while the pin 117 and the arm 112 continues to move forward. By this construction the side of the type adjacent to the ejectors is always in the correct position to be removed to the type-way. The reverse motion of the shaft 81 and arm 112, to that imparted by the cam is accomplished by the spring 114, secured to the lower end of the arm and the button 115, which draws the cross head, 116, and the ejector, 119, back and holds the latter against the block 120 and "liners" 124.

The type "set" mechanism (Fig. 7 and 10) consists of a sliding block 120, of hardened steel, resting on the plate 121 secured to the head by means of a second block, 122, and pin, 123. The ejector 119 abuts, in its back movement, against the block 120. Interposed between the two blocks 120 and 122 are placed "liners" 124, of various thickness and numbers, sufficient to give the required "set-wise" measurement to the type: these liners regulate the distance the ejector 119 travels backward. The rock shaft 81, arm 112, and cross head 116 that actuate the ejector, are so arranged that they stop at any point in their back movement as soon as the ejector 119 comes in contact with the block 120, in accordance with the number of "points" comprised by the liners, 124, inserted between the blocks. The spring, 114, actuates the parts in their backward movement and permits the parts to stop as stated; however, it is important to start the ejector, 119, on its backward movement by a positive acting device, in order to overcome the cohesion between it and the type which it has just delivered, and insure the ejector being back far enough to clear the insert mold, 170, as it moves forward to make the next cast. This is accomplished by a counter cam, 106, of sufficient length to rotate the shaft, 81, just enough to force the ejector back to clear the said insert mold, which cam then ceases to act. The spring, 114, continues the movement until the ejector encounters the block, 120, thereby stopping the ejector in proper position to produce the desired "set-wise" size of the type. This mechanism insures the absolute "set-wise" size of type and requires no skilled labor or manipulation whatever, as the parts automatically respond to the "liners" inserted, and as each matrix has engraved on it a number of "points" to be inserted by the "liners", to give the required "set-wise" size of the type body to conform to the character to be cast, all that is required, on the part of the operator, is to select the proper "liners" and insert them between the blocks 120 and 122.

The type delivery mechanism (Figs. 7, 8 and 9) comprises a dog, 130, that has a vertical reciprocating movement in the head yoke 20, said dog being forced downward by the spring 131 to knock the type 200 from the ejector 119 as it delivers the same to the predetermined distance for that purpose. The dog 130 is prevented from dropping out of its bearing, in the yoke 20, by a notch in the dog and the pin 132, and it is pressed against the plate 133 by the spring 135, secured to the yoke 20, to insure the dog always being in the exact position relative to the end of the ejector 119 to deliver the type back of a recess, 146, in the type-way 134, which is of importance when removing 1 "point" spaces. Adjacent the dog 130 is a jet breaking dog 150 also held in position by a pin 132 and held in a normally lowered position by a spring 153. A rock lever 136 is pivoted to the body 7 at 137 (Figs. 1, 2,) and extends under the type way, one end of said lever engaging with the projection 151 of the dog 150 to raise the same. The latter dog is provided with a projection 138 that engages a counter projection 138ᵃ on dog 130, whereby the two dogs are raised in unison. The rock lever is operated from the end that projects toward the ram, which end is moved and held down by means of the trigger 139, pivoted to the cam 18, acting on the incline 147 as the ram 9 moves back until the same has nearly completed its stroke, when the trigger 139 passes off the incline and the lever is released, which allows the springs 131 and 153 to instantly act and force the dogs 130 and 150 down to perform their functions and move that end of the lever with them and raise the opposite end thereof. The trigger 139 pivoted to the cap 18, swings back, as the ram 9 moves forward and passes over the incline on the rock lever 136, which is then elevated. When the ram 9 has made its complete forward stroke the trigger drops into its normal place, to again engage the incline, and actuate the rock lever, 136, when the ram makes its return stroke. The dog 130 rises high enough to permit the maximum size type to pass under it, thereby requiring no adjustment in removing the various size type from the ejector. Adjacent to the removing dog 130 is arranged a shoe, 141, supported on a pin, 140, that is vertically adjusted by means of the eccentric 142 and graduated knob 143, to set the same to suit the body-wise size of the type cast, and yieldingly held downward against the type 200 by the spring 144 to keep the type in their position along the type-way. Interposed between the type 200 and the shoe 141, and secured to the latter, is a flat spring, 145, which extends to and around the dog 130 to hold the type 200 in their position when the dog 130 is lifted to act on the following cast, and in addition projects over the ejector 119 when the latter has made its full stroke forward, with the projected end slightly inclined, in order that when the ejector 119 is moving a type forward the spring will be slightly elevated by the type coming in contact therewith and the latter held back against the ejector to insure its exact position for the dog 130 to force it down back of the recess 146, which is slightly below the type surface of the mold. The correct co-action between the several type removing and holding parts is exceedingly essential, especially in casting one "point" spaces, and their self-adjustments are important. The only manual requirement resides in turning the knob 148 to the designated graduation thereon, that corresponds to the "body-wise" size of the type to be cast, to an index mark on the end of the yoke, 20, which does not require skill or judgment.

The jet removing mechanism (Figs. 8, 9 and 10) comprises the dog 150 reciprocating vertically in the same recess, in the yoke 20, that carries the type removing dog 130. The projection, 151, thereof engages with the rock lever 136 by which it and the dog 130 are lifted as previously explained. The recess formed in the lower end of the dog 150 (Fig. 9) allows the type jet 201 to pass therein when the dog is raised, and when the trigger 139 passes off the incline on the rock lever 136 the spring 153 drives the dog down with sufficient force to break the jet from the largest type and the movement thereafter continuing, forces the jet free from the type and delivers it on the incline 154, under the jet, from which the jet drops into a receptacle. As the type and jet remain quite hot at this stage of the operation, after practically breaking the jet from the type-body, the tendency of the jet is to adhere to the body, therefore, the necessity of the continued movement of the dog 150 to insure its complete removal otherwise it would cling to the type and cause the parts to clog and cause trouble. The jet recess in the dog 150 is of sufficient width to take the widest jet and, therefore, no adjustment is required in changing from one size type to another.

The foot finishing mechanism, (Fig. 10) comprises a serrated knife 161 secured to the type-way 134, by suitable screws, and permanently located in relation to the jet orifice of the mold, whereby the knife is always in position to encounter the serrated jet surface of all size type, and therefore requiring no adjustment in changing from one size type to another. The knife also tools a small groove in the foot of the type to insure the same being free from projections. The serrated knife teeth are slightly advanced, one beyond the other, forming a slight angle in reference to the movement of the type, in order that the fractured surfaces of the type feet are gradually tooled off as the type are forced along the type-way. The type-way 134 is cut away, under the teeth, to form a cavity to permit the removed particles to freely pass below and discharge into the same receptacles that catch the removed jet. The slight angle of the teeth in reference to the path of the type also causes a slight backward pressure on the type as they are moved along, which tends to keep them in a uniform position. The bead 162 on the type-way fits the nick, formed in the side of the type, and keeps the type in line and also holds the feet against the inclined teeth on the knife, thereby insuring the removal of all the projections thereon and the groove cut to a uniform depth in the type feet. At the same time the shoe 141 pressing down from above holds the type against the type-way 134, thus, between the back pressure of the teeth angle, the bead 162, and the action of the shoe, firmly holds the type in proper position until completed, when they are removed to the cases.

The manual operation, to make ready, consists of first igniting the main burner 33, to melt the metal in the receptacle 31, and then the pilot burner 34, to heat the nipple 35, and by conduction heat the mold parts. The ejector 119 is then placed in position and the matrix 180 that is desired, is placed in the holder and the holder and matrix secured to the movable mold part 170 by the screw 181. The operator notes the "point" number on the matrix, that has been inserted, in order to enable him to select the proper "liners" 124, to give the number of "points" which are required to insure the proper "set-wise" size of the type-body to suit the type-character on the matrix. The insert mold 170 is then placed in position with the tee slot 177 over the head of the stem 11. The "liners" 124 required to make up the proper "set-wise" size of the type are then placed between the blocks 120 and 122 and the yoke 20 clamped to its position on the machine head 21. The knob 143 is then turned to adjust the height of the shoe 141, to suit the "body-wise" size of the type to be cast, by placing the graduation that corresponds with the size type opposite the index mark. The hand-wheel 5 is then turned to ascertain if the parts are in their proper positions, with the molten metal valve mechanism cut out, by handle 94, when making this test. The machine is then ready for action and power is applied by moving the clutch wheel 4 inward. The time to perform the above operations consumes from two to five minutes, and obviously does not require skilled or expert labor therefor.

The machine operation consists in the pulley 2 transmitting power to the shaft 3 which latter operates the crank wheel 8 and by means of the connecting rod 10 and its connections, reciprocates the ram 9 (Fig. 3). As the ram moves forward it carries with it the wedge 15 and insert mold 170, and by means of the stem 11 places the insert mold 170 in its position relatively to the stationary mold part, and the ram 9 continuing to advance, the spring 12 permitting the same, forces the wedge 15, by means of the stem 13, forward, between the roller 16 and the insert mold, thereby clamping and firmly holding the latter in its place.

Simultaneously with the above operations, while the ram 9 is moving forward, the arm 82 connected to the ram is moving the shaft 81, also forward (Fig. 2, 5 and 6) and lifting, by means of the lever 83 and dog 85, the weight 80, which is raised to its maximum height about the time the mold 170 is placed and clamped to the stationary mold. At this high position of the weight 80 and point of time in the operation, the lug 89 on the latch 90 engages with the keeper 88 and as the mold parts are now in position to receive the cast, a slightly further movement of the shaft 81 releases the short end of the lever 83 from the dog 85 and the weight is thereby dropped, operating the pump parts and the metal valve mechanism and exerting the full force of the weight on the metal in the well 54, ejecting it into the mold and casting the type.

By the first position of the weight's downward movement, when the insert mold is placed and clamped to the stationary mold part, the valve stem 50 is instantly moved back, the eduction valve 51 opened and the induction valve 52 closed, by the lower end of the lever 55 moving back, by the action of the spring 62 when the lug 60 drops away from the roller 64. The lug 64 being attached to the pump lever 61, the first part of the movement of the latter sufficiently clears the roller 64 to allow the lower end of the valve lever 55 to make its full movement and thereby place the eduction valve 51 and the induction valve 52 in their proper positions for the metal to be ejected into the mold. The pump lever 61 continuing its movement, after the lug 60 leaves the roller 64, engages with the lower jaw of the clevis 71, and, by means of the rod 70, forces the pump plunger 73 downward against the metal of the well 54. The induction valve 74, in the pump plunger, closes at the first portion of the plunger's movement and the metal confined in the well connections, is driven into the mold through the passage 53, the port 191, and jet orifice 189 (Figs. 3 and 11).

The movement of the shaft 81 continuing while the weight 80 is dropping, the dog 99 engages the incline 102 on the latch 90 (dotted lines, Fig. 6) and disengages the lug 89 from the keeper 88, which releases the latch from the weight and the pump lever 61 and the pump parts are instantly forced to their normal or "up" position by the spring 100. In this "up" movement of the pump lever 61 the pump plunger 73 is drawn up and the induction valve 74 opened, admitting metal to the well through its port; the valve 51 seated; the metal cut off from the jet at the right heat unit and the induction valve 52 opened, to permit the molten metal to fully equalize in the receptacle 31 and well 54, ready for the following cast.

The type having been cast, the ram 9 makes its return stroke, the first two-thirds thereof being devoted to the withdrawing wedge 15 from under the roller 16 and the insert mold 170 from the stationary mold parts, leaving the type just cast ready to be ejected, which is accomplished by the last third of the return stroke of the ram 9 engaging the roller 110 with the incline on the cam 111, thereby "rocking" the shaft 81 and by means of the arm 112 and cross head 116 forcing the ejector 119 forward (Fig. 7) and placing the type 200 under the dogs 130 and 150. Simultaneously therewith the trigger 139 passes off the rock lever 136 (Fig. 8) which frees the latter and allows the dogs 130 and 150 to act, one removing the type from the ejector and the other breaking and removing the jet.

As the type are cast and placed on the type-way 134 they are held down by the shoe 141 and spring 144, forced forward by the ejection of each succeeding cast, and the feet thereof tooled off by the knife 160, and the type are thus finished ready for use.

A modification of the machine as a whole is illustrated in Figs. 15, 16 and 17, and of certain parts in Figs. 18, 19 and 20. The principles of the invention, or the inventive ideas, are the same in both structures although the applied mechanics in the two structures are of a different form. The various parts of the structure of the modifications are designated by the same numerals as are used for designating analogous parts of the structure first described, but in the modifications such numerals are combined with letters. The power mechanism consists of a pulley $2^a$, shaft $3^a$, hand wheel $5^a$ and power clutch mechanism operated by the wheel $4^a$. The movable mold part $170^a$ is vertically reciprocated by the rock arm $9^a$, pivoted to the yoke $20^a$, and the cam $8^a$, secured to the shaft $3^a$ and rotated thereby. The type ejector $119^a$ is operated from the cross head $116^a$ which is moved forward to a predetermined distance by the cam $111^a$, rotated by shaft 3ª, engaging with a roller on the cross head 116ª. The return movement thereof is accomplished by the spring 114ª forcing the parts back against a horizontal block, 120ª, which passes through a slot in the cross head 116ª and secured rigidly to the body of the machine. The "liners" 124ª are inserted through said slot, in the cross head, in order to stop the back movement of the ejector 119ª at the proper point to produce the desired "set-wise" size of the type-body. The cam 83ª lifts the weight 80ª by coming in contact with the roller 85ª, attached to the weight, and drops the same by passing from under the roller when the weight is raised to its maximum height to permit the latch 90ª to engage the keeper 88ª, when the mold parts are in position to receive the cast. The cam 99ª is secured to the shaft 3ª, adjacent to the cam 83ª and in such relation thereto that when the cam 83ª releases the weight 80ª, and the latter is dropping, the lower end of the latch 90ª encounters the hook on the cam 99ª, as it rotates, and the latch is thereby released from the keeper 88ª and the pump mechanism disengages from the weight. The latch 90ª and adjacent parts thereto, and mode of operation thereof, as shown in Fig. 17, are substantially the same in both the first described and modified structures, in the latter structure the latch is released by the revolving cam 99ª, instead of the reciprocating dog 99.

The mold mechanism in the modified machine (Fig. 16) comprises a movable mold part 170ª that reciprocates vertically in a bearing in the yoke, 20ª, and is provided with an extension 184ª that passes in and out of a recess, 185ª, in the stationary mold block 172ª. The said extension is provided with a wedge (see dotted lines) that engages with the follower 300ª located in the recess 185ª, and clamps the mold, 170ª, to the side of the block 172ª as the movable mold part moves downward. The movable mold part 170ª serves to cast all sizes of type, as when the ejector 119ª is changed to a different size the spring 12ª, interposed between the rock arm 9ª and mold 170ª, compensates for the increased or decreased size of the ejector, by allowing the rock arm, 9ª, to make its maximum stroke and the mold to stop at any point regulated by the size of the ejector. The follower 300ª is provided with springs to raise it flush with the top surface of the mold block 172ª when the extension 184ª on the mold 170ª is withdrawn from the recess, and thereby fills the latter to permit the type to be ejected. The matrix is supported on the lower end of an oscillating arm (not shown) that is pivoted to the mold 170ª and oscillates in such a manner that when the mold 170ª is placed on the ejector, 119ª, and the rock arm 9ª continues to move down, by compressing the spring 12ª, it moves the upper end of the matrix arm from the mold and the lower end toward the same and thereby places, and holds, the matrix against the mold parts while the cast is made. When the rock arm, 9ª, moves upward the matrix is moved from the face of the type and carried up with the mold.

As shown in Fig. 18, the latch 90ᵇ is modified to disengage from the weight 80ᵇ without depending on a moving cam or dog, actuated by the machine. In this additional modification the latch 90ᵇ is provided with an incline, 89ᵇ, that engages with a counter incline on the plate 88ᵇ secured to the weight 80ᵇ and held in frictional contact with the plate 88ᵇ by a spud and spring 95ᵇ. The spring 95ᵇ is of sufficient power to create a frictional resistance between the inclines, equivalent to the pressure to be applied to the molten metal to cast the type, and when the weight 80ᵇ is dropped the force thereof is applied to the pump parts up to the frictional resistance of the inclines created by the spring, 95ᵇ, the inclines then slide one on the other, and release the latch from the weight. The latch and pump parts are moved to their "up" position by the spring 100ᵇ, and the weight drops its full stroke. When the weight is raised the upper side of the plate 88ᵇ engages and forces back the latch 90ᵇ to allow the incline thereon to pass over the incline on the lower side of the plate and reëngage the incline 89ᵇ to again act. By this modification, the effect is to release the weight automatically from the pump parts as soon as the resistance of the metal in the mold and well has reached a predetermined pressure, and it requires no care or adjustment in casting different size type.

As shown in Fig. 19, the overflow of excess molten metal to relieve the pump parts from undue jar, in casting small type, is modified by having the passage 75ª discharge into a second well 301ᶜ provided with a plunger 302ᶜ held down by the spring 303ᶜ, in order that when the flow of the metal into the mold is suddenly stopped the overflow passes into the well 301ᶜ and the inertia thereof gradually absorbed by the spring 303ᶜ, which effectually relieves the pump parts from the sudden jar they would be otherwise subject to in casting small type with the same pressure that is employed to cast large type.

As shown in Fig. 20, the means to actuate the metal valve parts are modified by having the valve stem 50ª actuated, to open the eductive valve 51ª, by the force of the metal, when the pump acts, coming against a piston, 304ᵈ, attached to the stem 50ª. The metal forces the piston back, thereby unseating the valve 51ª and when the pump pressure is relieved from the molten metal the piston is forced forward to reseat the valve 51ª and permit the eduction valve port 52ª to be opened by the spring 305ᵈ acting on the lever 306ᵈ, which latter is pivoted to the receptacle 31ª. By this modification the valve parts are actuated independently of any mechanism movement of the machine, and require no changes or manual adjustment to cast the various size type.

It is obvious, as shown by the different modifications herein, that the applied mechanics or construction of this machine can be greatly altered, varied, or other forms may be substituted therefor which contain substantially the same mode of operation by which the results are accomplished, without departing from the scope of the invention as defined by the claims.

By the term "head mechanism" used in the specification, is meant those parts of the machine which support the mold mechanism and around which the various actuating parts are grouped; and it is to be understood that the "head" may be formed integral with the body or base of the machine, or be a separate part attached thereto.

The term "mold mechanism" includes any construction capable of casting various sizes of type irrespective of the form of such construction or its movements, or number of parts, i. e., there may be a plural number of movable or "insert" mold parts, 170, any one of which may be used with a common stationary mold part to cast various sizes of type, as in the structure first described, or a single movable mold, 170ª, adjustable for various sizes of type, as shown in the modified structure, and the stationary mold part may be altered and arranged in various ways; therefore, any mold mechanism that will accomplish the casting of various size type, is included within the term "mold mechanism" and within the claims.

The term "actuating mechanism" includes any sub-combination, or its equivalent, acting individually to perform a single function, or a combination of several sub-combinations co-acting to perform a plurality of functions, i. e., when the phrase "actuating mechanism" occurs in the claims it may mean only one sub-combination, if that combination performs its functions in the manner specified in the claims, or it may mean two or more sub-combinations if such are co-acting to perform functions in the manner specified in the claim.

We are aware that various patents have been issued, both foreign and domestic, for type casting and setting machines operated by key-board actions, and also for type-casting machines *per se*, for use in type foundries which require skilled labor to adjust and operate, therefore, we do not include within our claims such machine or combinations, but we believe we are the first to invent a "sorts" machine for producing finished type that is adapted, and practical, for use in printing offices and which can be operated by unskilled labor. We believe we are the first to invent a machine whose actuating mechanism for the several parts will adjust or regulate themselves to the conditions established by any size of type mold that may be selected from a wide range of different sizes. We believe we are the first to provide a plurality of movable mold parts that are interchangeable with a common stationary mold part and that are self-adjusting in assembling. Our claims therefore include any means that operate by substantially the same mode herein employed, and which produce the same result, whether specified or not.

Having thus fully described the invention, what we claim and desire to secure by Letters Patent is:—

1. A machine for casting type comprising a head, mold mechanism secured thereto, and a pivoted yoke independent of the mold parts to cover the latter to prevent spurts of molten metal in case the mold mechanism is not entirely closed.

2. A machine for casting type comprising a head, a metal receptacle yoke pivoted to the head, and a molten metal receptacle loosely supported at opposite sides in said yoke.

3. A machine for casting type comprising a head, a metal receptacle yoke pivoted to the head, and a molten metal receptacle suspended at its opposite sides in said yoke.

4. A machine for casting type comprising a head, a yoke pivoted to the head, and a molten metal receptacle yieldingly supported in the yoke, whereby the metal receptacle may be swung around for inspection and cleaning, and adjust itself to the mold parts when in the operating position.

5. A machine for casting type comprising a head, mold mechanism having a stationary mold part secured to the head, and projections arranged to support the said stationary mold part and to form an air space between the mold part and the head.

6. A machine for casting type comprising a head, mold mechanism supported by said head, and means to insulate the head from the mold mechanism, whereby the mold will be retained at uniform temperature and the heat of the mold prevented from passing to the head.

7. In a machine for casting type, a mold comprising a stationary non adjustable mold part, and a plurality of interchangeable movable mold parts each provided with casting faces of different dimensions and each adapted to coact with the stationary mold part, whereby one part of the mold is always retained unchanged for use in casting type of various sizes.

8. In a machine for casting type of various sizes, a stationary non-adjustable mold part forming two walls of the mold cavity, one of said walls containing the jet cavity, and a plurality of interchangeable movable mold parts provided with casting faces of different dimensions and each adapted to coact with the stationary mold part, whereby one mold part is always retained unchanged for use in casting type of various sizes.

9. In a machine for casting type of various sizes, a mold including a stationary mold part, and a plurality of interchangeable movable mold parts provided with casting faces of different dimensions and each adapted to coact with the stationary mold part, said movable parts being each provided with means for carrying a matrix.

10. In a machine for casting type of various sizes, a stationary non-adjustable mold part, a plurality of interchangeable mold parts provided with casting faces of varying dimensions, said interchangeable mold parts being each constructed to coact with the stationary mold part, whereby said stationary mold part remains unchanged in casting type of various sizes, and means for reciprocating said stationary mold parts, said stationary mold part having its top face provided with guiding means adjacent the mold cavity.

11. In a machine for casting type of various sizes, a stationary non-adjustable mold part, and a plurality of interchangeable slidable mold parts provided with casting faces of different dimensions and each adapted to coact with and guided by said stationary mold part, whereby one part of the mold is retained unchanged in casting type of various sizes.

12. A machine for casting type of various sizes comprising a three part mold forming a complete mold cavity, one part consisting of a movable type ejector, a second part of a size to cast type of the largest set-wise and bodywise size, and a third part movable with relation to the other parts of said mold and completing the same, the size of the type one way being determined by the size of the ejector and of the cavity in the movable mold section, and the size of the type in the other direction being determined by the normal position of the ejector.

13. A machine for casting type of various sizes comprising a stationary mold part, operating means, and a movable mold part having a loose connection with said operating means, both mold parts being provided with abutting surfaces at right angles to the plane of movement of the movable mold part, whereby said movable mold part when assembling will adjust itself in a position to cast type bodies of various sizes with feet and faces accurately squared to the sides of the type.

14. A machine for casting type of various sizes comprising a stationary mold part and a movable mold part, both of said parts having gaging surfaces which contact when the mold is closed, said surfaces forming a predetermined or fixed point from which the setwise size of the type is measured.

15. In a machine for casting type, a mold for casting type of various sizes having an immovable part provided with a jet orifice, the outlet of which communicates with the mold cavity, said orifice and outlet being permanently fixed relative to the base of the mold cavity, whereby the jet is always of uniform thickness and located in the same plane irrespective of the size of the type.

16. In a machine for casting type of various sizes, a stationary mold part, a movable mold part coacting with said stationary mold part, a jet plate provided with a jet orifice, and means for varying the area of said orifice.

17. In a machine for casting type, mold mechanism for casting type of various sizes provided with a jet orifice the median line of the outlet of which is located in the same definite relation with respect to one wall of the type cavity irrespective of the size thereof, whereby the jet will always be located in the same position on the type.

18. In a machine for casting type, mold mechanism for casting type of various sizes provided with a jet orifice the median line of the outlet of which is located in the same definite relation with respect to one wall of the type cavity irrespective of the size thereof, whereby the jet will always be located in the same position on the type, and means for varying the size of said jet orifice.

19. In a machine for casting type of various sizes, a mold comprising adjustable members for casting various "bodywise" sizes of type, an immovable nipple plate having a port always in the same relative position with respect to the bottom wall of the mold cavity, and a molten metal mechanism connected at said port, whereby the metal mechanism does not require any adjustments in casting various sizes of type.

20. In a machine for casting type of various sizes, a stationary mold part, a movable mold part provided with a plurality of casting faces, and a guide device adjacent the stationary mold part provided with means for engaging the body of said movable mold part to guide the same in its movement toward and from the stationary mold part.

21. In a machine for casting type of various sizes, a mold including a stationary member and a movable member guided by said stationary member, and means for bringing said members together, said members being provided with means whereby they are automatically and accurately positioned.

22. In mold mechanism for casting type of various sizes, a fixed mold section forming two sides of the mold cavity, one of said sides being immovable and provided with a jet opening communicating with the mold cavity and permanently fixed relative to the base of said cavity, whereby the jet is always of uniform thickness and located on the same plane irrespective of the size of the type, interchangeable movable ejectors of various body sizes, and interchangeable movable insert mold sections provided with casting faces of different dimensions and each adapted to coact with said fixed mold section and said ejectors, whereby one stationary part may be used in casting type of various sizes.

23. Mold mechanism for casting type of various sizes comprising a stationary mold part, a movable mold part, and a type ejector forming one wall of the mold cavity, and reversible so that one end of the ejector may be used for casting type, and the other end used for casting spaces and quads.

24. In a machine for casting type of various sizes a sectional mold provided with interchangeable type ejectors, means for adjusting the type ejector to vary the size of the mold cavity, a jet ejector, and means whereby the type ejector will automatically engage the jet ejector as the former is placed in operative position.

25. In a machine for casting type of various sizes, mold mechanism comprising a stationary nonadjustable mold part, interchangeable movable mold sections provided with casting faces of different dimensions, and interchangeable movable type ejectors of different body dimensions, and a single movable jet ejector independent of the type ejector for operating on the jets for all sizes of type cast.

26. In a machine for casting type of various sizes, a mold comprising a non-adjustable fixed portion and a plurality of movable portions, means for varying the size of the mold cavity by changing the movable portions, and a single jet ejector operative with every size or adjustment of movable mold portions, said jet ejector being independent of said movable mold portions.

27. In a machine for casting type, a mold formed of a nonadjustable member provided with a jet orifice of fixed cross section, interchangeable type ejectors provided with casting faces of various dimensions and each constructed to coact with said non adjustable member, and a single jet ejector of a cross section corresponding to that of said jet orifice.

28. In a machine for casting type, mold mechanism for casting type of various sizes provided with an adjustable cavity for casting the body of the type and a non adjustable cavity for casting the jet, a type ejector working in the body cavity, and an independent jet ejector the cross section of which conforms to that of said jet cavity.

29. In a type casting machine, mold mechanism for casting type of various sizes comprising a stationary mold part, a movable mold part for shaping a plurality of the walls of the type cavity, said movable part being provided with means for carrying a matrix, and an ejector forming one wall of the type cavity.

30. In a type casting machine, mold mechanism for casting type of various sizes comprising a stationary mold part, a movable mold part for shaping a plurality of the walls of the type cavity, a matrix holder secured to said movably mold part, and an ejector forming one wall of the type cavity.

31. In a type casting machine, mold mechanism for casting type of various sizes comprising a stationary mold part, a movable mold part for shaping a plurality of the walls of the type cavity, a matrix holder adjustably mounted in said movable mold part, and an ejector forming one wall of the type cavity.

32. In a machine for casting type of various sizes, a mold provided with a stationary member having a jet cavity, a movable mold part having a longitudinal right angle formation constituting two walls of the mold cavity, said movable mold part having an extension projecting beyond the forward end of said right angle formation to close the jet cavity, and means for imparting a longitudinal reciprocation to said movable member.

33. In a machine for casting type of various sizes, mold mechanism comprising a stationary mold part, a reciprocating mold part interlocking with the stationary mold part and provided with a matrix, an ejector forming one wall of the type cavity, and means for operating said movable mold part and said ejector.

34. In a machine for casting type of various sizes, the combination with the nipple for discharging the molten metal, of a stationary mold part adjacent said nipple, a reciprocating mold part interlocking with the stationary mold part and provided with a matrix, an ejector forming one wall of the type cavity, and means for operating said movable mold part and said ejector.

35. In a machine for casting type of various sizes, mold mechanism comprising a stationary mold part, a type ejector forming one wall of the type cavity, a movable mold part having two longitudinally extended right angled walls which form the sides of the type body from end to end, and a matrix secured to the said movable mold part, and closing one end of the type cavity.

36. In a machine for casting type of various sizes, mold mechanism comprising a stationary mold part, a matrix, a removable mold part having a right angled formation one end of which is constructed to support the matrix at two sides of its casting surface, and an ejector forming one wall of the type cavity.

37. Mold mechanism for casting type of various sizes comprising a stationary mold part, a type ejector forming one wall of the type cavity, and a movable mold part carrying the matrix and provided with a right angled formation which projects over the ejector when the parts are assembled.

38. Mold mechanism for casting type of various sizes comprising a movable mold part forming a longitudinal wall of the type cavity, a matrix, a matrix holder carried by the movable mold part and covering the back of the matrix, and means to exert a pressure on the matrix holder to press and hold the matrix firmly to its position in relation to the movable mold part.

39. Mold mechanism for casting type of various sizes comprising a movable mold part forming a longitudinal wall of the type cavity, a matrix, a matrix holder carried by the movable mold part and having a flange extending around its sides and forming a recess into which the matrix accurately fits, and means to press on the matrix holder and keep the matrix to its position.

40. Mold mechanism for casting type of various sizes comprising a movable mold part forming a longitudinal wall of the mold cavity and having a transverse slot to receive the matrix, a matrix bearing against one side of said slot, and a matrix holding device bearing against said matrix.

41. Mold mechanism for casting type of various sizes comprising a stationary mold part provided with a jet cavity, and a movable mold part provided with means for carrying a matrix and having a right angle formation constituting two longitudinal walls of the type cavity, said movable mold part being provided with an extension to close the side of said jet cavity.

42. Mold mechanism for casting type of various sizes comprising a stationary mold part forming a longitudinal wall of the mold, and a movable mold part both having abutting surfaces at right angles with respect to the direction of movement of the movable mold part, said surfaces being adapted to meet when the mold parts are assembled to adjust the latter, said movable mold part being also provided with a surface parallel to its abutting surface against which a matrix is adapted to bear to insure a type face at right angles to the side of the type body and parallel with the foot thereof.

43. Mold mechanism for casting type of various sizes comprising a mold formed of separable parts provided with automatic means whereby said mold parts will be accurately positioned in adjusting themselves to changes in the size of the cast.

44. A machine for casting type of various sizes comprising a mold formed of separable parts, and actuating mechanism for assembling said mold parts and supplying molten metal to the mold, said actuating mechanism including means for automatically compensating for changes in the size of the cast, whereby the molten metal is supplied in correct quantity and proper density and skilled adjustments obviated.

45. A machine for casting type of various sizes comprising a mold formed of separable parts, and actuating mechanism for assembling said parts, said actuating mechanism being provided with means for permitting the mold parts to conform to varying conditions due to wear and temperature.

46. A type casting machine comprising mold mechanism for casting type of various sizes, actuating mechanism therefor and means for automatically adapting the said actuating mechanism to changes in the size of the cast.

47. A type casting machine comprising mold mechanism for casting type of various sizes, actuating mechanism and means for automatically modifying the action of said actuating mechanism to conform to varying conditions established by said mold mechanism due to wear and temperature.

48. A type casting machine comprising mold mechanism for casting type of various sizes, means for assembling the parts of said mold mechanism and automatically adjusting them in relation to each other, actuating mechanism for said assembling means, and automatically controlled means for adapting said assembling means to changes in the size of the cast.

49. A machine for casting type comprising a stationary mold part, a movable mold part, the latter changeable to vary the size of the cast, actuating mechanism, and means for automatically adjusting said actuating mechanism to conform to changes in the size of the cast.

50. A machine for casting type of various sizes comprising a movable mold part forming two longitudinal walls of the mold cavity, a ram which actuates the same, means for detachably connecting said mold part to said ram, and a spring to permit the ram to continue to move after the movement of the mold part ceases, to compensate for any change in size of the parts due to wear or expansion.

51. A machine for casting type of various sizes comprising a movable mold part forming a longitudinal wall of the mold cavity, a ram to supply motion thereto, a stem loosely related to said mold part to place the same in position, and a spring to afford a yielding connection between said mold part and said ram.

52. A machine for casting type of various sizes comprising mold mechanism including a plurality of movable members, actuating mechanism for the movable members, and means for yieldingly attaching said movable members to said mechanism, whereby the mold members are permitted to accurately adjust themselves to changes in condition of said mold members.

53. A machine for casting type of various sizes comprising mold mechanism including a plurality of movable members, mold placing mechanism for assembling said movable members, power applying mechanism therefor, and yielding means interposed between the movable mold members and power applying mechanism, whereby the mold members are permitted to accurately adjust themselves to changes in condition of said mold members.

54. A machine for casting type of various sizes comprising mold mechanism including a plurality of movable members, and mold placing mechanism for assembling said mold members, said mold placing mechanism being provided with means for permitting said mechanism to conform to changes in the condition of said mold.

55. A machine for casting type of various sizes comprising a ram, a stem, a spring acting between said ram and stem, a wedge, a link connecting the stem and wedge, a bearing, a movable mold part which is clamped by the wedge, and a stationary mold part with which said movable mold part coacts.

56. A machine for casting type of various sizes comprising mold parts, yielding wedge mechanism to clamp the mold parts together, and mechanism for operating said wedge mechanism, whereby the wedge will always clamp the parts rigidly together irrespective of any wear or change in the size of the parts.

57. A machine for casting type of various sizes comprising mold parts, wedge mechanism, and means to actuate the wedge mechanism and loosely connected thereto, whereby all of the mold parts are clamped and securely held in their proper position in relation to each other.

58. A machine for casting type of various sizes comprising a mold formed of a plurality of separable parts, means for assembling said parts, said assembling means including means for automatically adjusting the parts, and clamping mechanism for securing said parts in any position to which they may be so adjusted.

59. A machine for casting type of various sizes comprising mold mechanism, a normally stationary molten metal receptacle, and yielding mechanism to hold the said two parts in contact by which any expansion is compensated for.

60. A machine for casting type of various sizes comprising mold mechanism, and a normally stationary molten metal receptacle connected in operative position with the mold mechanism, said receptacle being supported on the same horizontal plane as that of the connection between the two, whereby the vertical expansion of the parts will not affect the relative position of the said molten metal connection.

61. A machine for casting type of various sizes comprising mold mechanism, a normally stationary molten metal receptacle, a nipple connecting the said receptacle and mold mechanism, and trunnions supporting said receptacle in substantially the same horizontal plane as the nipple, whereby vertical expansion is permitted without affecting the connection between the nipple and the mold mechanism.

62. A machine for casting type of various sizes comprising a yoke, a normally stationary molten metal receptacle supported in said yoke, and means carried by said yoke for yieldingly engaging said receptacle, whereby the latter is free to shift and make proper connection with the mold mechanism.

63. A machine for casting type of various sizes comprising a mold formed of separable parts, a rigid locking device for clamping said parts together, a carrier for said locking device, and a yielding connection between said carrier and said locking device.

64. A machine for casting type of various sizes comprising mold mechanism, in combination with means for feeding molten metal thereto, and means automatically governed by the size of the mold cavity for shutting off the feed of said metal to the mold parts.

65. A machine for casting type of various sizes comprising a mold, an ejector to eject the type from the mold, mechanism to impart motion to the said ejector, and a spring interposed between the two to afford a yielding connection, whereby the ejector is stopped at a given position and the movement of the mechanism is continued.

66. A machine for casting type of various sizes comprising a mold, an ejector to eject the type, operating mechanism for said ejector, and a yielding connection between said ejector and its operating mechanism.

67. A machine for casting type of various sizes comprising a mold including an ejector forming one wall of the mold cavity, means for operating said ejector, and a stop for arresting the movement of said ejector at the same point irrespective of the size of the type being cast.

68. A machine for casting type of various sizes comprising a movable ejector, an abutment to limit the movement of said ejector in one direction, and means for varying the effective position of the abutment, said means comprising insert liners of predetermined size loosely laid in beside the abutment, and means for operating said ejector.

69. A machine for casting type of various sizes comprising a movable ejector, an abutment to limit the movement of said ejector in one direction, means for varying the effective position of the abutment, said means comprising insert liners of predetermined size loosely laid in beside the abutment, a cam, and mechanism interposed between the cam and said ejector to transmit motion to the latter.

70. A machine for casting type of various sizes comprising a mold formed of separable parts, and interposed members of predetermined size for limiting the movement of one of said mold parts, said members being loosely laid in position, whereby they may be readily removed and replaced.

71. A machine for casting type comprising a mold, an ejector therefor, means for reciprocating said ejector, and means for limiting the movement of the ejector in one direction, said means including members loosely laid in position, whereby they may be readily removed and replaced.

72. A machine for casting type comprising means for casting type of various set wise sizes, and interposed members of predetermined size for positively regulating the set, said members being loosely laid in position, whereby they may be readily removed or replaced.

73. In a machine for casting type of various sizes, mold parts including interchangeable type ejectors adjustable in a setwise direction, a single jet ejector for use with any one of said interchangeable ejectors, and interposed members of predetermined size for limiting the movement of said ejectors, said members being loosely laid in position, whereby they may be readily removed or replaced.

74. In a machine for casting type of various sizes mold parts including interchangeable type ejectors, means for adjusting said ejectors in a setwise direction, and a single jet ejector adapted for use with any one of said type ejectors.

75. A machine for casting type of various sizes comprising mold mechanism, a type way to receive the type, a type-removing dog, and laterally yieldable means for pressing said dog toward said mold mechanism.

76. A machine for casting type comprising mold mechanism, including an ejector, a type way to receive the type, a dog for removing the type from said ejector, and a spring to hold the type prior to and after its removal from the ejector.

77. A machine for casting type of various sizes comprising mold mechanism including a reciprocating ejector, a type way, and mechanism for removing the type from the ejector irrespective of the size of said type, said removing mechanism being normally stationary and supported above and independently of said ejector.

78. A machine for casting type comprising mold mechanism in which the type are cast, a dog to remove the type from the mold parts, and a type way to receive the type, said type way being located slightly below the eduction passage of the mold to form a shoulder, whereby the type when removed from the mold parts are prevented from passing back thereto.

79. A machine for casting type of various sizes comprising mold mechanism in which the type are cast, a type way to which the type are delivered, a non adjustable spring pressed reciprocating dog to break and remove the jets from the various "body-wise" sizes of type from the maximum to the minimum, whereby all sizes of type will have their jets removed without manual adjustment of any of the parts, and means to move said dog against the action of its spring.

80. A machine for casting type of various sizes comprising mold mechanism in which the type are cast, a type way to receive the type, and vertically reciprocating spring pressed means to break the jets from the type immediately after the cast and thereafter entirely separate the jets from the type, whereby the removal of the jets are insured and clogging of the machine parts prevented.

81. A machine for casting type of various sizes comprising mold mechanism provided with a jet orifice located at the same distance from one wall of the mold for all bodywise sizes of type, a type way to receive the type from the mold, and foot finishing mechanism permanently located with reference to said jet orifice.

82. A machine for casting type of various sizes comprising mold mechanism provided with a fixed jet orifice, a type way to receive the type from the mold, a knife to finish the feet of the type, a shoe to press the type against the type way, and a bead to hold the type against the knife, whereby the type are firmly held in their correct positions to be properly finished.

83. A machine for casting type comprising a plurality of separable mold parts, means for assembling said parts, means for automatically adjusting said assembling means to conform to changes in the size of the mold cavity, and molten metal mechanism for injecting metal into the mold.

84. A machine for casting type comprising mold parts provided with means for casting type of various body and set wise sizes, mechanism for operating said parts, and means for connecting said mold parts to said operating mechanism, said parts being incapable of adjustment with relation to said operating mechanism.

85. In a machine for casting type, a mold provided with means for varying the size of the cast, and a plurality of interchangeable matrices of uniform size, said mold being provided with means for correctly locating the character of each matrix with relation to the mold cavity irrespective of the size of said cavity.

86. In a machine for casting type, a mold provided with means for varying the size of the cast, and a plurality of interchangeable matrices of uniform size, said matrices and mold being provided with means that coact to properly position each matrix in the mold irrespective of the size of the mold cavity.

87. Means for casting type of various sizes comprising a stationary mold part, plurality of matrices of uniform dimensions and each bearing a different type character, and a plurality of interchangeable mold parts provided with casting faces of different dimension, and each adapted to coact with said stationary part, said mold parts being each provided with means for supporting any one of said matrices.

In testimony whereof we affix our signatures in the presence of two witnesses.

FRANK H. BROWN.
JOHN E. HANRAHAN.
GEORGE A. BOYDEN.

Witnesses:
THOS. B. CAMPBELL,
CHARLES B. MANN, Jr.